United States Patent [19]

Meritt

[11] 4,435,755

[45] Mar. 6, 1984

[54] BALANCED CHANNEL FINDING METHOD

[75] Inventor: Allan S. Meritt, Poughkeepsie, N.Y.

[73] Assignee: International Business Machines Corporation, Armonk, N.Y.

[21] Appl. No.: 334,991

[22] Filed: Dec. 28, 1981

[51] Int. Cl.³ .............................................. G06F 3/00
[52] U.S. Cl. ................................................... 364/200
[58] Field of Search ........................................ 364/200

[56] References Cited

U.S. PATENT DOCUMENTS 3,810,105  5/1974  England .............................. 364/200

*Primary Examiner*—Raulfe B. Zache
*Attorney, Agent, or Firm*—Bernard M. Goldman

[57] ABSTRACT

For a CPU I/O request, the disclosed methods find a physical channel path within a logical channel (LCH) likely to be connectable to a requested device by using channel path count (CAT count) fields. The CAT counts respectively indicate the current number of uncompleted requests accepted by the respective physical channels in the data processing system. An available physical channel in the LCH with the smallest CAT count is found as the candidate channel path for a connection attempt to the requested device. If the lowest CAT count is equal for plural available channel paths, any of these plural channel paths may be selected as the candidate channel path. The CAT count for a channel path is incremented for each successful connection of any device to that channel path. The CAT count for a channel path is decremented upon receiving a signal indicating that a successfully connected I/O device has completed the operation for a request. CAT counts indicate the current load on each physical channel across all LCHs in which the physical channels may be contained. The CAT counts indicate the relative likelihood of the physical channels within a LCH being non-busy relative to each other in order to find the channel path most likely to be non-busy and thereby avoid a RPS miss when a requested DASD record is reached during disk rotation. Choosing the channel paths with the lowest available CAT counts balances the load among the physical channels across all LCHs containing the same physical channel.

20 Claims, 13 Drawing Figures

FIG. 2 (SYNC CH SELECTION WITHOUT SIOF QUEUING)

FIG. 3 (SYNC CH SELECTION WITH SIOF QUEUING)

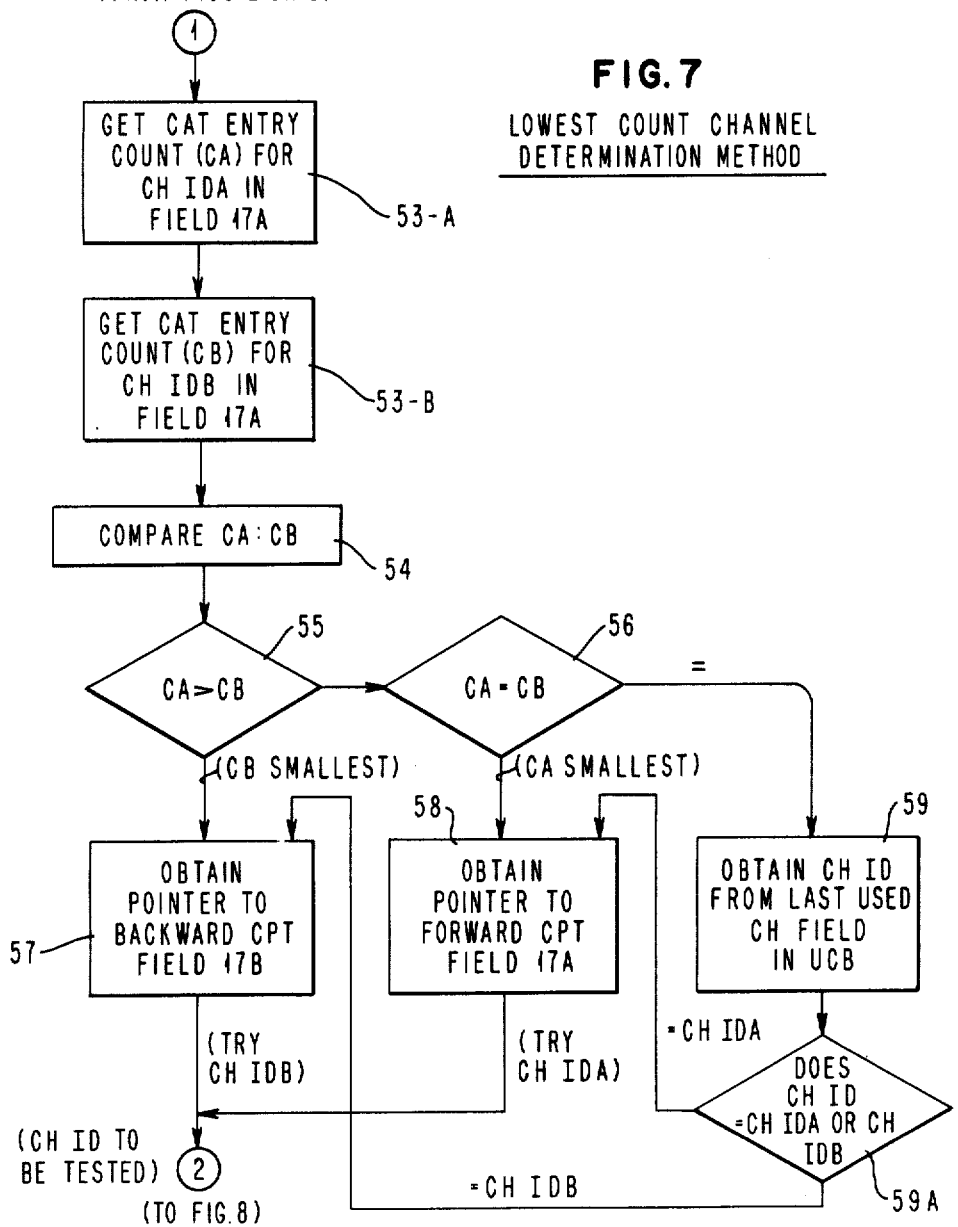
FIG. 7
LOWEST COUNT CHANNEL DETERMINATION METHOD
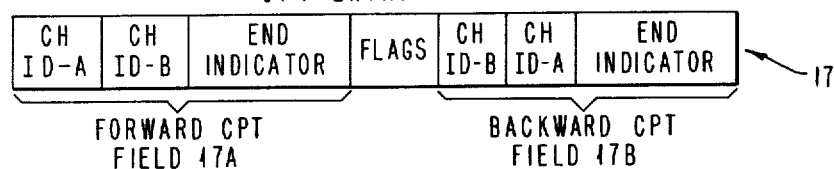

FIG. 8  PHYSICAL CHANNEL FINDING METHOD

FIG. 9 LOWEST COUNT CHANNEL FINDING METHOD

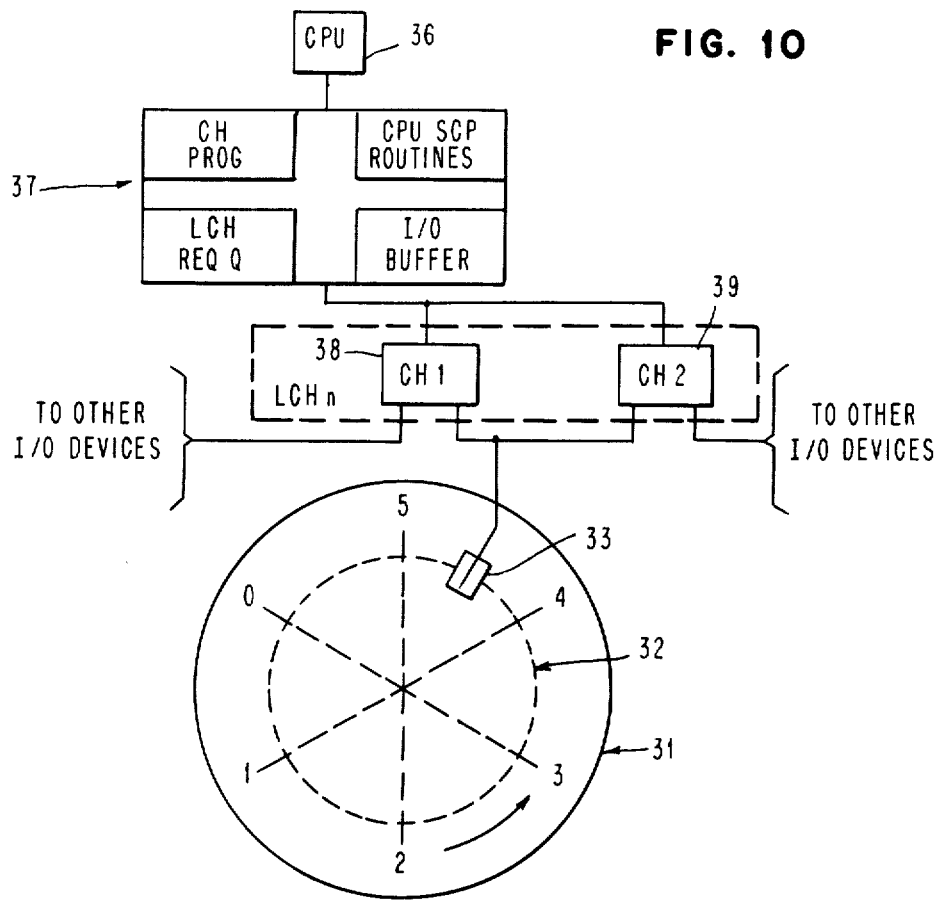
FIG. 10
FIG. 11
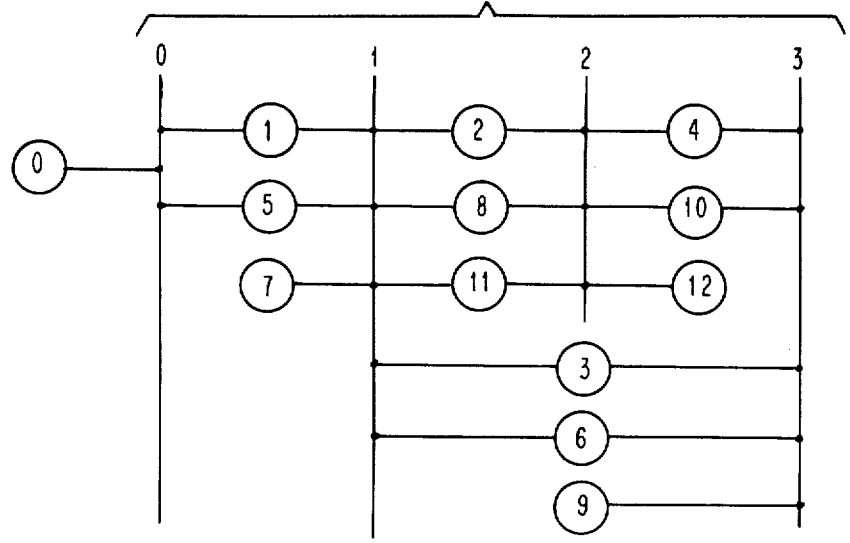
PHYSICAL CHANNEL IDS

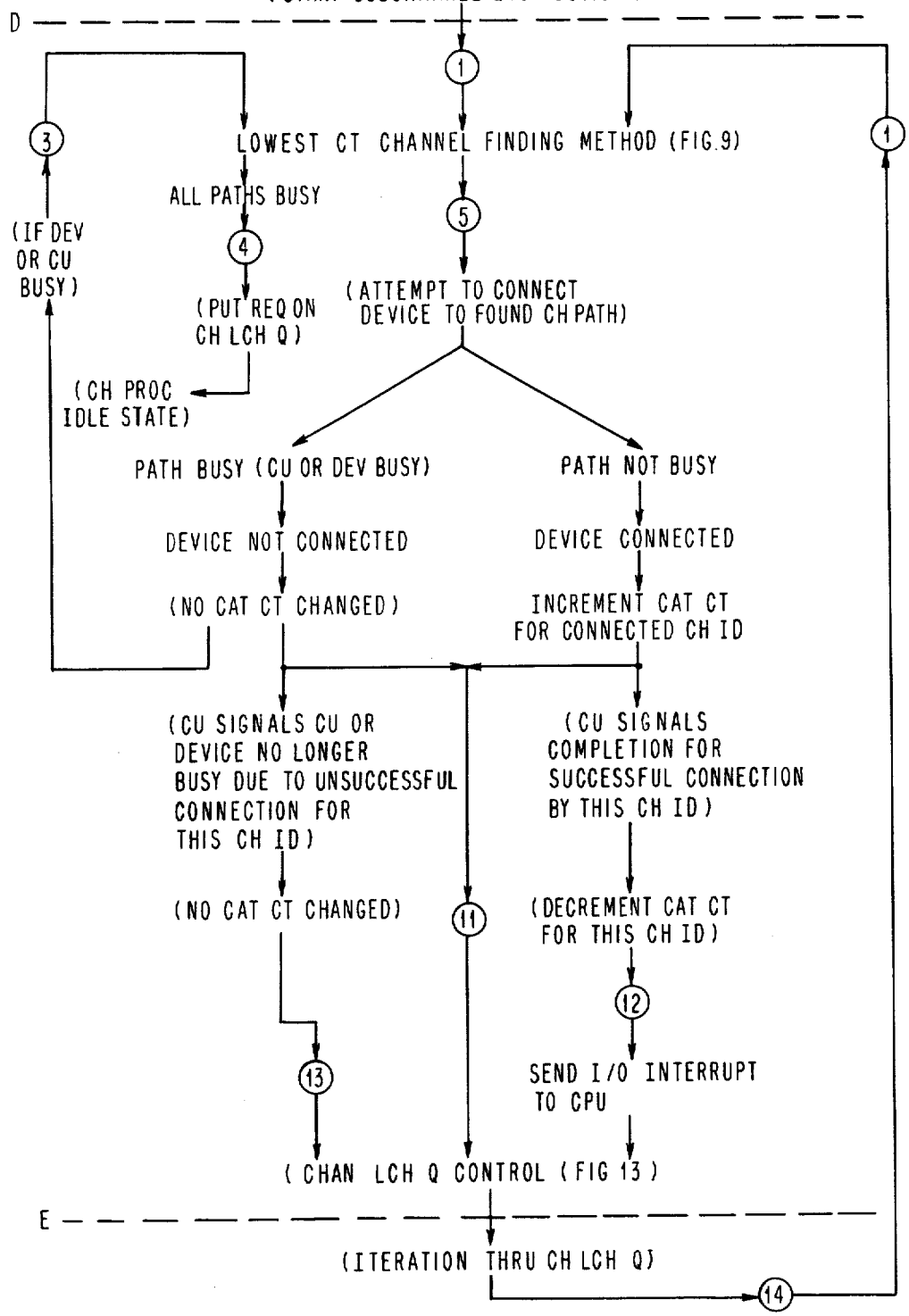
FIG. 12 CPU INSTRUCTION STREAM I/O REQUEST (START SUBCHANNEL INSTRUCTION)

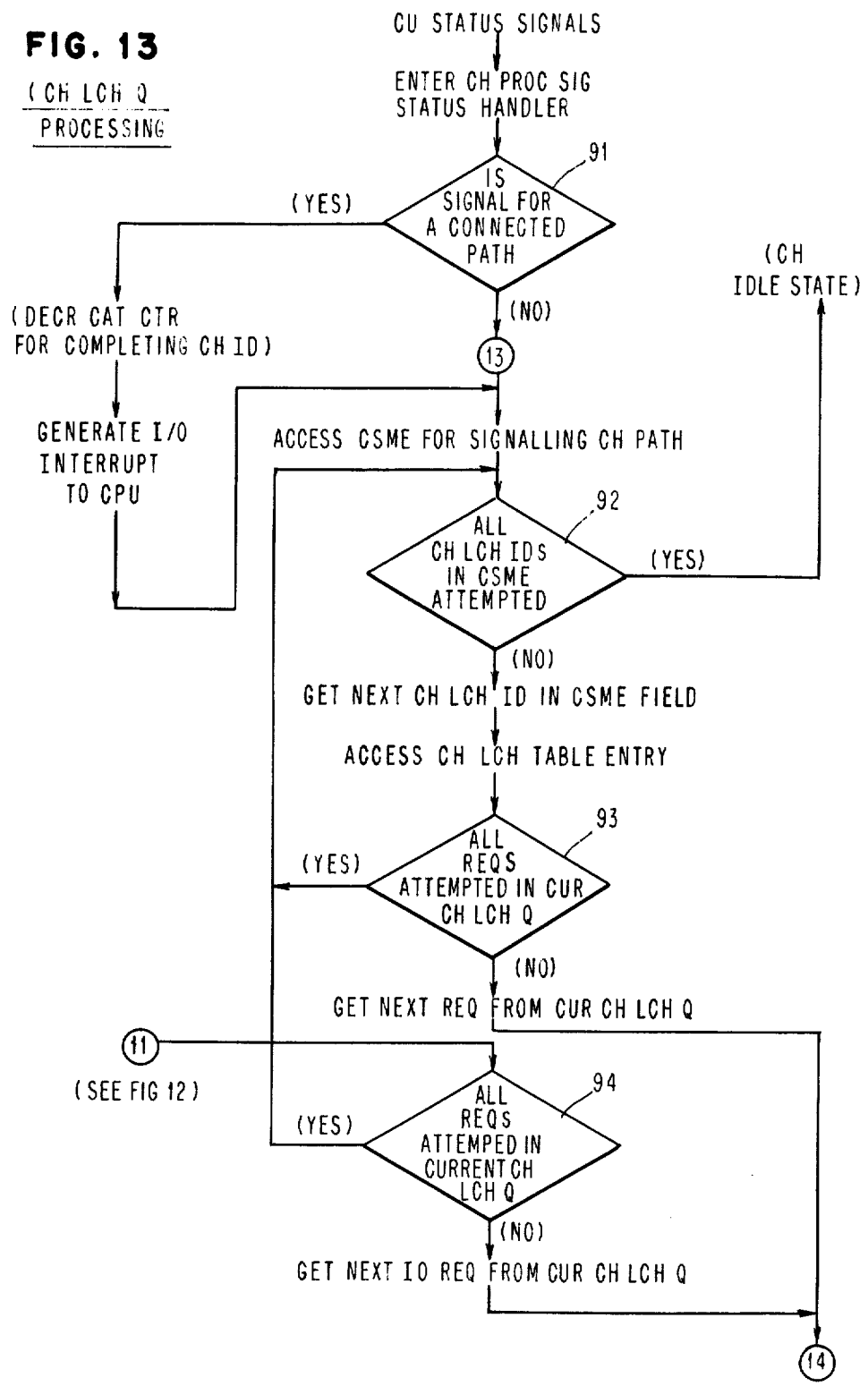
FIG. 13 (CH LCH Q PROCESSING)

BALANCED CHANNEL FINDING METHOD

FIELD OF THE INVENTION

This invention relates generally to improvements in methods for finding the most efficient channel path to assign to a CPU (central processing unit) request for an I/O device in order to improve the average access time of I/O data requested by the CPU.

DESCRIPTION OF PRIOR ART

FIG. 10 illustrates a fast access disk 31 (i.e. DASD) which may be of the type available in the prior art. It has a plurality of sector boundaries 0 through 5 in which a track 32 on disk 31 is rotating beneath a head 33 which is capable of either writing or reading data for track 32. The data is written or read a record at a time, which may start and end arbitrarily in relation to sector boundaries. For example, suppose a DASD record in track 32 may begin between sector boundaries 3 and 4, and it is requested by an application program executing on a central processing unit (CPU) 36. Before the record can be accessed on the DASD device, the application program calls a system control program (SCP) and the SCP causes the CPU to execute a series of housekeeping instructions in preparation for the SCP executing a start I/O (SIO or SIOF) instruction in an attempt to connect an available path to the device, so that it can read or write the required record when that record passes beneath head 33. The path finding operation looks for a path of possible connection between the device and the CPU, which for a SIOF instruction includes a non-busy channel while the device and its control unit (CU) may then be busy; and which for a SIO instruction includes a non-busy channel but the device and its CU must also then be non-busy. When the disk record is read or written by head 33, its selected data is transferred into or from an I/O buffer area within main storage 37. The process of finding a path to the requested device is called herein the method of attempting to assign or to connect a path to the device to start the device operation.

Whether the SCP executes a SIOF, rather than a SIO instruction, depends on whether the system hardware and microcode can support the execution of a SIOF instruction.

The CPU 36 is capable of executing many thousands of instructions within the time that it takes disk 31 to spin through a single sector. There are hundreds (and often there are thousands) of preparatory instructions executed by the SCP between an I/O request by an application program and the SCP execution of the SIO or SIOF instruction which actually connect the device.

Furthermore, there may be a plurality of channels through which the data from head 33 may be transferred to memory 37, e.g. channel 38 or channel 39. Since either physical channel 38 or 39 can connect to device 31, the SCP considers them together as a single logical channel (LCH) to device 31. A LCH includes all physical channels in the system capable of connecting to a CU in the system. A CU may connect any device in the CU's set of devices to the LCH. Thus, each I/O device will have a LCH assigned to it, which includes all physical channels connectable to the device. It is possible that at the time the SCP picks one of the channels 38 or 39 in the LCH, that the picked physical channel is busy, because it is connected to some other I/O device at that time, so that another connection attempt will need to be done.

A LCH is considered busy if all of its physical channels are busy at the time of execution of a SIO or SIOF instruction, and the SCP then puts the I/O request on a LCH queue. A LCH is considered non-busy if any of its physical channels is non-busy, i.e. if any LCH channel path to the requested device is available. For SIO or SIOF, a request is put on a LCH queue when it is made to a busy LCH. When for a SIO instruction the LCH is not busy, but all non-busy physical channels in the LCH cannot provide an available path to the requested device due to a CU or device being busy, the request is also put on the LCH queue. When a request is made to a busy LCH queue, the request is later attempted again and eventually is satisfied by connection of the requested device to a channel path in the LCH. When the requested operation is connected (i.e. CC=0), the request is deleted from the LCH queue.

Since execution by a requesting application program is usually terminated temporarily when it makes an I/O request to the SCP, the CPU execution of the I/O device connection operations are asynchronous with the CPU execution of the requesting application program.

Since a substantial amount of unknown time may pass before any channel becomes unbusy in a busy LCH, the SCP will not wait for a channel to become unbusy at some unknown future time, but the SCP will then put that I/O request on a LCH queue for the requested device, and then the SCP will dispatch other work on the CPU. Thus, a connection for a LCH queued request is also asynchronous with the requesting SCP.

When any busy channel completes an operation, it sends an I/O interrupt signal to the CPU, which indicates to the CPU that the channel is going from a busy to non-busy state. Each I/O interrupt signal to the CPU initiates execution of a first level interrupt handler (FLIH) routine in the SCP. The FLIH initiates an IOS (input output supervisor) routine that attempts to connect those requests in all LCH queues for all LCHs containing the physical channel sending the I/O interrupt currently initiating the FLIH. (A physical channel may be found in more than one LCH, because a physical channel may be connectable to different CU's in the system.)

In this manner, CPU 36 will again execute the IOS instructions for each attempt to connect any I/O device to either channel 38 or 39. It is possible that both channels 38 and 39 in the requested device LCH will for the next attempt again be busy, in which case the request remains on the software LCH queue, from which another attempt will be made at a future time until a physical channel path in the LCH becomes available and the device is connected.

When a connection attempt is successful, the device remains connected until its requested operation completes. However, the channel and/or CU in the connection may be temporarily released from the connection for use by some other request's connection.

For example, such temporary release of a channel or CU may occur for a DASD seek or set sector operation for the requested device. For a set sector operation, the device will attempt to re-establish the connection when a requested sector position is reached during the disk spin. (The time required to perform a set sector command is called disk latency time.) If either the CU or channel is busy with another connection when the failure to re-establish the connection before the record is reached is called a rotational position sensing (RPS) miss. A large increase in access time (e.g. 10 milliseconds or more) occurs for each RPS miss.

In FIG. 10 for example, a requested DASD record between sectors 3 and 4 in track 32 may pass under head 33 while a busy and therefore unavailable channel 38 is the subject to some other connection for some other request, resulting in a RPS miss for the requested DASD record. Therefore, disk 31 must take an extra spin extending this request's access time by an additional 10 milliseconds before a next re-establishment of the connection can be again attempted to access the requested record on DASD 31.

The prior used SCP methods of finding a physical channel in a LCH for assignment to a SIO (or SIOF) instruction execution included:

(1) Sequential Method–First try the physical channel in the LCH with the lowest channel ID number, and if it fails try the physical channels in the sequence of increasing channel ID numbers in the LCH.

(2) Reverse Sequential Method–First try the physical channel in the LCH with the highest channel ID number, and if it fails try the physical channels in the sequence of decreasing channel ID in the LCH.

(3) Last Used Channel–First try the physical channel in the LCH that had the last successful SIO (or SIOF) execution. If it fails, try the physical channels in an increasing (or decreasing) channel ID sequence in the LCH.

(4) Rotate–First try the physical channel in the LCH having an ID following the channel ID having the last successful SIO (or SIOF) execution. If it fails, try the physical channels in an increasing (or decreasing) channel ID sequence in the LCH.

The SCP channel finding routines may issue either a SIO or SIOF instruction. The SCP channel finding routine inserts the identifier (ID) of the found channel in the SIO or SIOF instruction before that SIO or SIOF instruction can be executed by the CPU for issuing a SIO or SIOF command to the channel processor. Which of the two instructions is used, depends on whether the pertinent channel hardware and microcode (comprising a channel processor) is capable of executing a SIOF instruction. For channel hardware capable of supporting a SIOF instruction, the SIOF instruction is generally used. Otherwise, the SIO instruction is used.

A channel processor that supports the SIOF instruction places an I/O request received in the SIOF command from the CPU on a channel request queue for the channel ID in the command when the requested physical channel is available but the requested device or its control unit (CU) is busy. If the channel, CU and device are all available during the execution of the SIOF instruction by the CPU, the device is connected and the I/O request is not put on any channel queue. The channel request queues are controlled by the channel processor. It is however a CPU responsibility when executing the SIOF instruction to have found a channel for connecting the CPU I/O request. After an I/O request is entered on a selected channel queue, the channel processor thereafter has the responsibility for connecting a busy device and/or busy CU to the selected channel. Then the channel processor senses when the requested device and its CU are unbusy by detection of a device end and/or CU end signal. Then the channel processor connects the device without any signal to the CPU, because the CPU assumed the device was connected (whether or not it actually was connected) when the CPU received an acceptance signal (i.e. CC=0) from the channel processor during the execution of the SIOF instruction. When the request is connected, the request is deleted from the channel queue.

For a channel processor not capable of supporting the SIOF instruction, the SIO instruction is used, for which the CPU issues a SIO command to communicate an I/O request to the channel processor, which will accept the command only if the requested device and CU are both non-busy and available. The channel processor sends its acceptance to the CPU by sending a CC=0 signal to the CPU. If the selected channel is available but the device or its CU is busy, the SIO command is rejected by the channel processor sending a CC=1 signal to the CPU. If the device is busy, the request is put on the LCH queue to await a future connection attempt after the device becomes non-busy. If the CU is busy, the CPU responds by re-executing the SIO instruction on a different channel path if any is available. When all paths have been attempted unsuccessfully, the request is put on the LCH queue. The request remains on the LCH queue until both the requested device and its CU become unbusy, at which time the requested device is connected, the channel processor signals its acceptance of the SIO command by sending a CC=0 signal to the CPU, and the I/O request is removed from the LCH queue.

Thus if a non-busy channel is found, a SIOF command to a supporting channel processor is executed only once and the CPU goes to its next instruction. But a SIO command to a channel processor may be executed over and over again even though a non-busy channel is found until the device is actually connected.

For example in FIG. 10, the SIO (or SIOF) routine may first find physical channel 38 busy and then find channel 39 busy. The channel processor rejects each CPU command by signalling a condition code of two (CC=2) to the CPU. The SCP routine concludes that the LCH for device 31 is busy and then enters the I/O request on a software LCH queue for the device. The LCH queue awaits a physical channel in the LCH later becoming unbusy which then becomes available for a SIO (or SIOF) instruction execution for a device connection attempt. The I/O requests in the CPU controlled LCH queues are driven by I/O interrupt signals received by the CPU from the channel processor. Upon receiving a later I/O interrupt signal, the CPU initiates an interrupt handler routine which accesses all requests on the LCH queue including the respective I/O request to try to connect all requested devices, including the respective request. When and if the channel finding routine finds the second physical channel 39 unbusy after finding physical channel 38 busy, the CPU then executes the SIO (or SIOF) instruction to connect channel 39.

FIG. 5 illustrates a well known example of control blocks used by prior channel finding routines. These blocks are found in main storage 37 shown in FIG. 10. Channel program 10 also exists in main storage 37. The I/O supervisor block (IOSB) 11 contains a channel program pointer 11A (i.e. address to its respective channel program 10). For each I/O device which may use that channel program, the IOSB 11 also contains a device pointer 11B to a respective unit control block (UCB) 12 representing the respective I/O device. The UCB 12 contains its device ID in a field 12A and contains an entry 12B with the ID of the last used channel (LUC) by that device. A LCH index pointer 12C in UCB 12 locates a LCH entry for the respective device in a logical channel (LCH) table 13, which contains an entry for every LCH in the system. Each entry in table 13 represents a different logical channel and locates an associated LCH queue for that logical channel.

FIG. 11 illustrates an example for relating LCH's and physical channels. The physical channel identifiers (ID's) are represented therein by the vertical lines labeled 0, 1, 2 and 3. The I/O device ID's are shown as numbers in circles with one or two horizontal lines to the left or right of each device ID connecting it to either one or two physical channels. It is assumed in FIG. 11 that each LCH may contain a maximum of two physical channels. The following LCH TABLE illustrates an example of logical channels 0 through 7, which are obtained from FIG. 11 by the connections of physical devices 0–12 to physical channels 0–3:

LCH TABLE

| LCH | Physical Channel | Device ID |
|---|---|---|
| 0 | 0 | 0 |
| 1 | 0 & 1 | 1, 5 |
| 2 | 1 | 7 |
| 3 | 1 & 2 | 2, 8, 11 |
| 4 | 2 | 12 |
| 5 | 2 & 3 | 4, 10 |
| 6 | 1 & 3 | 3, 6 |
| 7 | 3 | 9 |

In FIG. 5, each LCH table entry has the format 14. LCH entry format 14 contains a pointer 14A to an entry in a channel path table (CPT) 16, and a pair of pointers 14B and 14C to the beginning and ending of a LCH queue containing all unconnected I/O requests by the CPU to this respective logical channel.

In each LCH table entry 14 for a respective device, LCH queue pointer 14B addresses the start of its LCH queue and pointer 14C addresses the end of that LCH queue. The illustrated LCH queue comprises entries 21, 22 and 23. Each LCH queue entry 21, 22 or 23 contains a pointer to an IOSB for a requested device, and a chain pointer to the next entry in that LCH queue, except for the last entry 23 in the queue which contains an end code indicating that it is the last entry in the queue. Different IOSB's may be pointed to by the different entries in the same LCH queue, because they may represent different devices connectable to the same LCH which were requested by the different I/O requests in the queue.

Each entry in CPT 16 corresponds to a related LCH table entry 14 to define the LCH for the device in the related UCB 12. The CPT format 51 contains the IDs of all physical channels in that LCH. Thus, format 51 may define a LCH which contains the IDs for physical channels 38 and 39 in FIG. 10.

SUMMARY OF THE INVENTION

Since August 1981, this invention has been on sale in the IBM MVS/SP Release 3 (which may use the 3033 extensions feature to support channel queueing) to obtain a significant improvement in the average DASD access time by reducing the average number of disk rotational position sensing (RPS) misses. The MVS implementation of the invention finds a candidate physical channel with which to try to connect a requested device by using count fields in a channel availability table (CAT) entry provided for each physical channel in a channel set provided for a CPU. A CAT count field in each CAT entry indicates the current number of uncompleted requests accepted by a respective physical channel. The CAT count is incremented by each successful connection of a device by a SIO (or SIOF) instruction execution and is decremented upon the CPU receiving an I/O interrupt indicating the successfully connected I/O device has completed its request.

The invention may also be entirely embodied in a channel processor where the CPU only commands the channel processor to access a specified I/O device without specifying any channel path, so that the channel processor can then execute the channel path finding method to find the candidate channel path, and increment or decrement the CAT counts for all channel paths.

The physical channel CAT counts provide the invention with an indicator of the current statistical load of uncompleted requests on each physical channel in all of its logical channels to reflect its likelihood of being non-busy relative to any other physical channel in any logical channel, in order to find the best physical channel to connect a requested device, e.g. the channel most likely to be non-busy for the attempt to connect the device and subsequently when a requested DASD record is reached during the disk rotation.

The method of this invention iterates from the lowest CAT count channel path identifier (CH ID) to the next higher CAT count CH ID of a LCH until an available channel is found as the candidate channel or until no channel is found because all channels in the LCH are unavailable. If plural available channels are found to have the same lowest CAT count, any of these channels may be selected as the candidate channel.

The physical channel with smallest CAT count generally is the physical channel having the smallest outstanding request load, since this is the channel most likely to be non-busy and thereby avoid an RPS miss. The invention therefore tends to balance the request loads on the physical channels in all the LCHs by finding the physical channels with the smallest current loads, and is therefore called the balanced channel finding method.

This balanced channel finding method provides superior balancing results compared to the prior used channel finding methods previously discussed herein. These prior methods are further unbalanced by the use of the SIOF instruction, due to the channel processor not communicating back to the CPU when a connection is actually made. That is, after a physical channel is selected for a SIOF, a condition code of zero is provided to the CPU, regardless of whether the device was then connected or was not connected due to the control unit or device being busy. (That is, the SCP assumes the device is connected even though it will not be connected until later after the CU or device goes non-busy since there is no further SCP operation.) Thus, with a SIOF execution, a busy path can be found as a candidate by these prior methods even though a non-busy path may exist. That is, any of the prior methods may use the SIOF to select a channel path with a busy CU for a non-busy requested device, even though there may be an available second physical channel path with a non-busy CU to the non-busy requested device. As a result, the prior use of SIOF tends to cause further unbalancing of the loads on the physical channels. However, with this invention, physical channel load balancing is degraded significantly less by use of the SIOF instruction because the invention always selects an available channel with the smallest outstanding request load regardless of whether SIO or SIOF is used.

Hence, the invention is always likely to find the candidate channel path with the fastest connect probability, since that channel path will have the lowest (e.g. zero) available CAT count. The invention decreases the average CPU and channel processor access time for an I/O request by initially reducing the execution path length of CPU code in making a successful connection to the requested device as well as reducing the probability of a RPS miss while using that connection to thereby decrease wasted spins by a DASD, with the results of decreasing the elapsed time that the requesting CPU program has to wait for the requested data.

With this invention, when a new I/O request is issued by a CPU, the first physical channel found by the invention for a connection try is the physical channel in the LCH with the fewest uncompleted requests, i.e. the smallest channel availability table (CAT) count. If plural available channels in the LCH have the same CAT count, the tie can be broken by reverting to one of the old channel finding methods (e.g. last used channel), since any of the tied channels may arbitrarily be chosen as the candidate channel. If only one physical channel in a LCH happens to be non-busy, the invention will chose it rather than another physical channel because the chosen channel most likely will make the fastest connection to the requested device.

A desirable consequence of finding the physical channel most likely to be connectable (i.e. smallest available CAT count channel) is to reduce the average amount of SCP code executed per actual I/O connection (i.e. reduced instruction path length). That is, the number of connection attempts per successful connection equals the number of failed attempts plus the final successful attempt. Therefore if the number of unsuccessful attempts is reduced or eliminated, the amount of executed CPU code is correspondingly reduced.

After a particular successful connection to the requested device is made, the connected channel and/or CU is nevertheless temporarily disconnectable, when the device's current command is known to require a significant amount of time for its completion, e.g. seek or set sector command. During such temporary disconnection, the channel and CU are available to be used by some other request's connection, which may be a pre-existing connection or a connection being newly made. When the current command completes for the particular connection, the device requires the re-establishment of the particular connection with this channel and CU. However, either or both may be in use by a different connection at the time that the particular device completes a set sector command and has a timely need for this channel and control unit to avoid an RPS miss. A further desirable consequence of selecting channel paths by CAT count is to reduce the probability that the channel and/or CU will be unavailable to re-establish the particular connection at the time needed. This is because the lowest available CAT count path is the path with the fewest outstanding operations when the particular connection was initially established, which statistically is likely to continue to be the best path for the re-establishment of the particular connections when the set sector command completes.

With SIOF use, the CAT count is incremented even though the requested device may not be connected, due to the device and/or CU being busy, when a CC=0 signal is returned, which does not happen with SIO use. Thus, with SIOF use, the CAT count for each physical channel equals its number of: (1) unconnected but accepted SIOF requests and (2) connected but uncompleted SIO and SIOF requests.

With SIO use, the CAT count for each physical channel only equals its number of: (1) connected but uncompleted I/O requests. For example, when only SIOF is used, the number of connected I/O requests may be 80% to 90% of the total number of accepted I/O requests represented in the CAT count for that physical channel. The result of SIOF use instead of SIO use is therefore to increase the average CAT count values by perhaps 10% to 20% over what the CAT count would be if only SIO were used.

The method of this invention exploits the CAT count to make channel accepted but not yet connected conditions indirectly observable by the CPU software, even though the channel processor directly hides the busy conditions of the devices and CUs from the CPU software, since device and CU busy conditions are not communicated to the CPU after the channel processor acceptance of a CPU command for a device connection by any condition code signalling.

This invention therefore obtains as efficient CPU programming and channel path selection with SIOF instruction use as with SIO instruction use, although this invention improves CPU and channel efficiency with both instruction use. Many current S/370 programs use SIOF instructions instead of SIO instructions for perhaps 99% of the I/O requests because SIOF use allows the CPU to overlap program execution while the channel processor does the waiting for the requested device or CU to become non-busy. With the SIO instruction, the CPU must wait by LCH queuing the request if the device is busy or all paths are busy to a non-busy device which reduces CPU performance by requiring the CPU to later repeat the CPU path finding instructions.

The earliest publication discussing matter relating to the subject invention is in the IBM Washington System Center Bulletin entitled "MVS/System Release 3 Function and Performance Overview", Form No. GG22-9218, dated January 1981 but first published on Mar. 5, 1981.

DESCRIPTION OF THE DRAWINGS

FIGS. 7 and 8 are detailed flow diagrams found in an implemented embodiment of the subject invention for finding the most efficient channel to connect an I/O device.

FIG. 10 illustrates pertinent hardware used by the inventive methods of the subject invention.

FIG. 11 is a general diagram representing the relationship between logical and physical channels.

FIGS. 12 and 13 are flow diagrams of the invention in a channel processor environment.

DETAILED DESCRIPTION OF THE EMBODIMENTS

This invention is concerned with a new method of finding a physical channel path having fastest access to requested I/O data. FIGS. 1 through 4 show the invention embodiments in CPU programming which controls channel path finding in which the CPU programming finds a channel path and issues it to the channel processor in the form of a SIO or SIOF command. FIGS. 12 and 13 show the invention embodiments within a channel processor which controls channel path finding in response to a CPU command only specifying the I/O device to be accessed.

The invention is concerned that a wrong channel path (e.g. a busy channel when there exists a non-busy channel) may be found and result in the inefficiency of having to re-execute the channel finding programs again, or cause the CPU request to wait longer than necessary for the requested data.

It is less apparent that finding a wrong channel may significantly increase the access time for an I/O request, due to creating an inbalance in the utilization of the channels. The higher the utilization, the greater the probability of not accessing the required DASD record when it first spins under a DASD head (i.e. RPS miss) resulting in a large increase in access time (e.g. 10 milliseconds or more) for the request. The lost time of an extra spin (e.g. 10 MS or more) amounts to literally eons of time in relation to modern CPU operating speeds and can significantly reduce the CPU efficiency. This invention significantly improves the chance that a requested DASD record may be read during its first head pass and thereby avoid any RPS miss.

The channel processor (including any channel microcode) may receive a SIO or SIOF command from the CPU executing a SIO or SIOF instruction, which contains the device ID. The channel processor then tests the busy states for the device, its CU, and the physical channel found by the lowest CAT count channel finding method in FIG. 9 or FIGS. 7 and 8. Then the channel processor signals the CPU as to whether or not it is capable of connecting the requested device by sending a condition code (CC) into the current PSW register in the CPU to identify whether or not it can connect the requested device and send a CSW to the CPU. If the channel processor finds it can connect the device, it generates and sends a CC=0 signal to the CPU. If it cannot connect the requested device, it sends a non-zero CC (i.e. CC=1 or 2) to the CPU.

Figure 5:
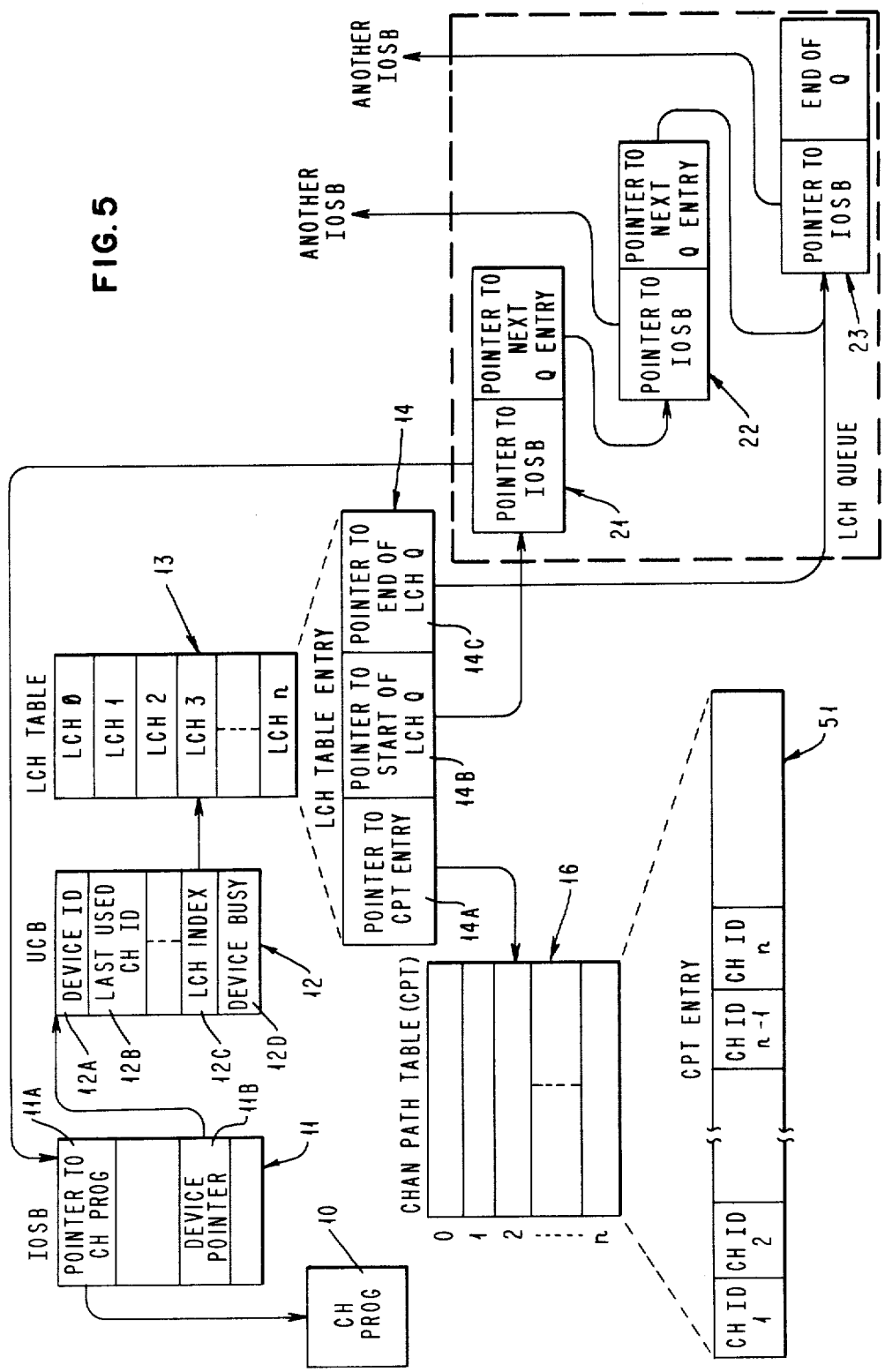
FIGS. 5 and 6 illustrate control blocks and their relationships used by the detailed embodiments of this invention while finding a particular channel for connecting a requested I/O device.

In current implementations of the invention, the CPU then executes a SCP routine that places the I/O request on the LCH queue for the respective device represented by the LCH index in the UCB 12 in FIG. 5.

Figure 6:
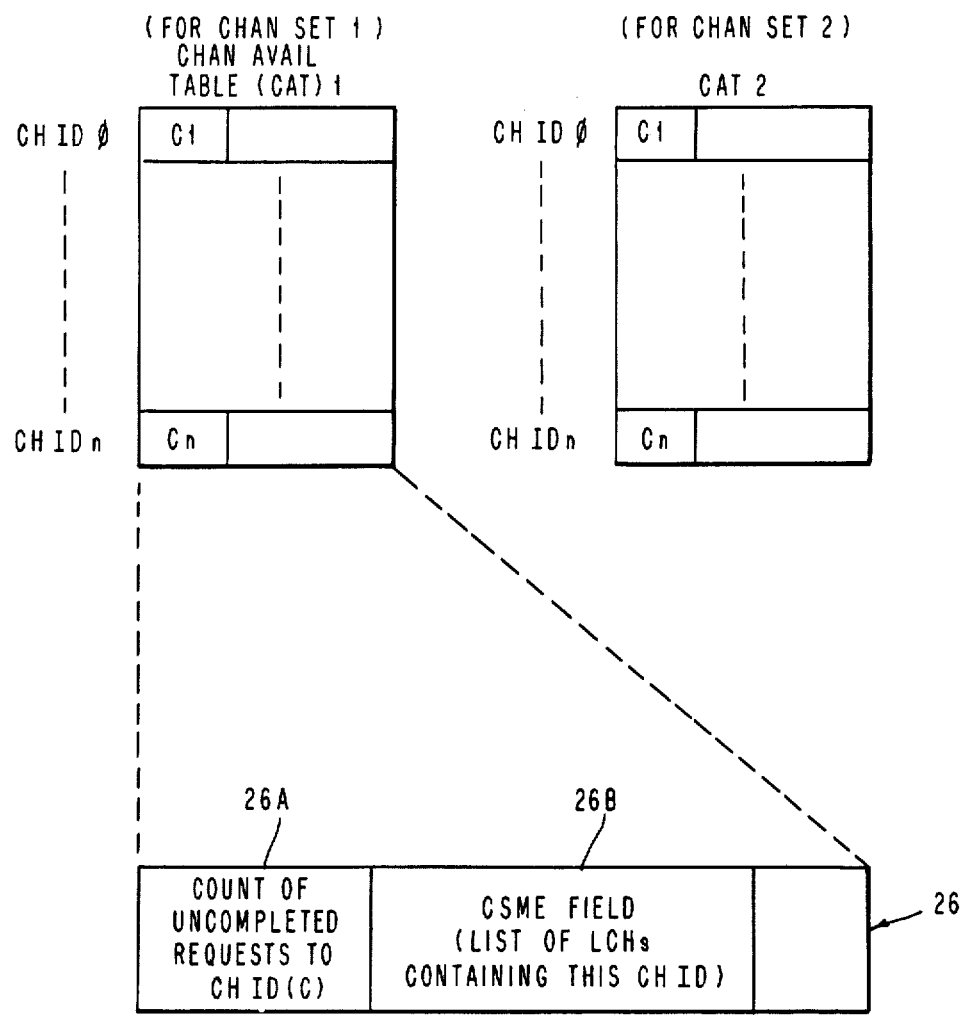

FIG. 6 illustrates two channel availability tables CAT1 and CAT2. Each CAT represents all physical channels in a channel set. A channel set is all physical channels that at any given time are directly controlled by a particular CPU in the S/370 architecture. Thus, CAT1 represents channel set 1 and CAT2 represents channel set 2. Each entry in a CAT corresponds to a respective physical channel identifier (i.e. CH ID). When a CPT entry (see FIG. 5) is obtained, each CH ID therein is used as an index in the CPU's CAT to access the associated CAT entry and obtain its fields 26A and 26B. Each CAT entry has the form 26 shown in FIG. 6 which contains fields 26A and 26B. Field 26A contains the novel CAT count (C) provided by this invention for the respective physical channel, which is the number of outstanding and uncompleted I/O requests for the physical channel ID represented by the respective CAT entry. The field 26B lists all LCHs which contain the physical channel represented by this CAT entry. The invention requires the CAT counts in its method of finding the physical channel which most probably can be selected to obtain the fastest access for reading or writing a record on an I/O device being requested by a CPU.

Figure 1:
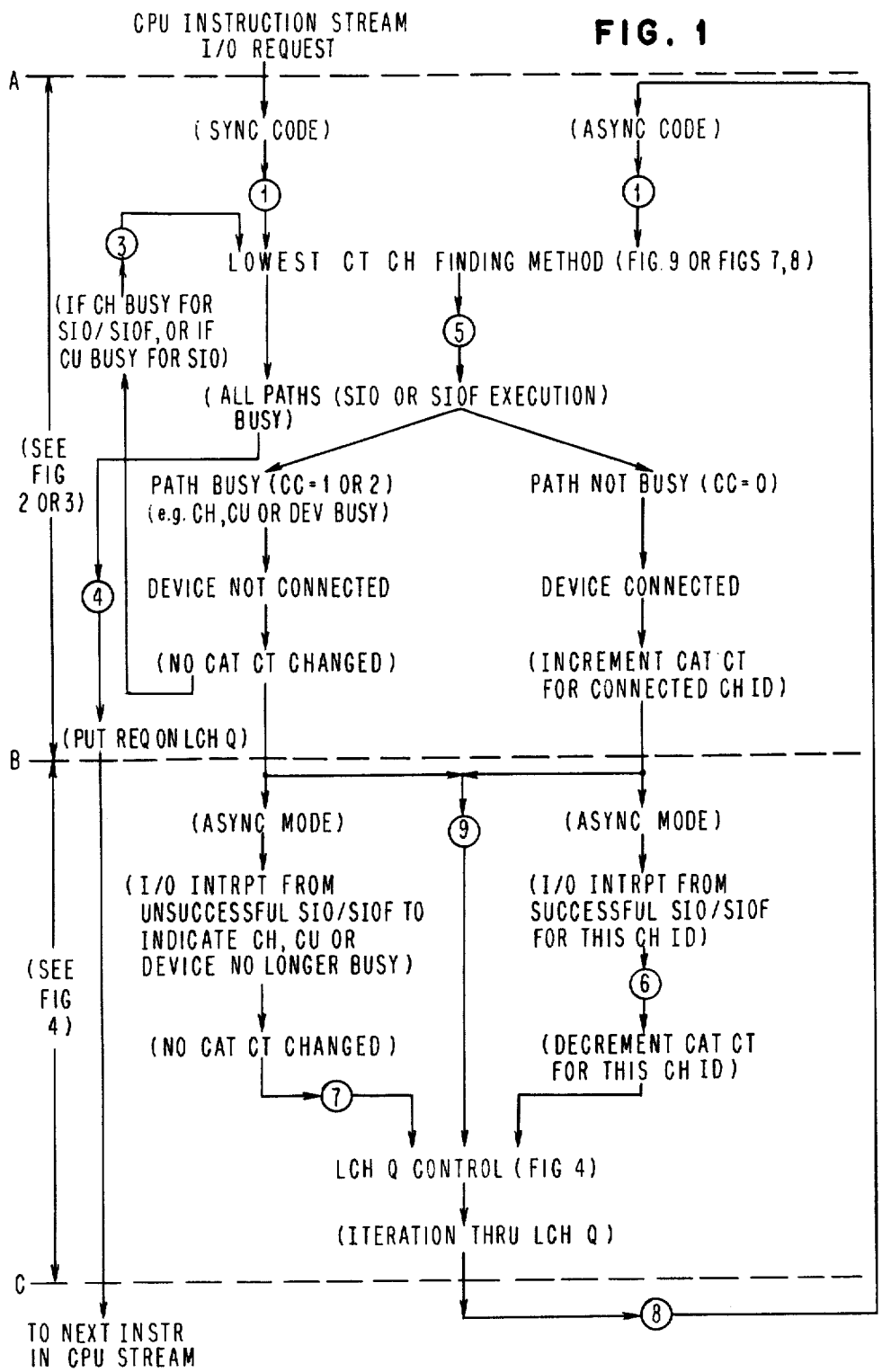
FIG. 1 is a flow diagram of the invention on a CPU environment.

FIG. 1 illustrates the operation of the channel finding embodiments in relation to successful or unsuccessful types of SIO/SIOF executions and their responding types of I/O interrupts. A successful SIO/SIOF execution is indicated by a CC=0 signal; and an unsuccessful SIO/SIOF execution is indicated by a non-zero CC signal, i.e. CC=1 or 2. The two types of I/O interrupts are: (1) a successful start I/O interrupt responding to the completion of an I/O operation resulting from a successful device connection (i.e. by a SIO/SIOF execution with a CC=0), and (2) an unsuccessful start I/O interrupt responding to an unsuccessful SIO/SIOF execution providing a CC=1 or 2 signal, which is used merely to signal when a requested path component (i.e. channel, CU, or device) becomes available.

The right-hand sequence of steps is taken in FIG. 1 from a successful SIO/SIOF instruction execution (connects a device and returns CC=0). The left-hand sequence of steps is taken from an unsuccessful SIO/SIOF instruction execution (does not connect the device and returns CC=1 or 2).

FIG. 1 also represents the synchronous and asynchronous modes of operation of the invention in relation to the CPU instruction stream. Synchronous operation occurs when the CPU instruction stream makes an I/O request to initiate the method, which remains synchronous until the channel processor returns the condition code completing the execution of the SIO/SIOF instruction which either connects or fails to connect the device and incrementing a CAT count for successful connection. Thereafter, the method in FIG. 1 becomes asynchronous with the I/O requesting CPU instruction stream, because the method thereafter becomes dependent on the occurrence of the resulting I/O interrupt which depends on variable I/O device, CU and channel characteristics.

Only in the right-hand path for an initially successfully connected device is the CAT counter for the selected physical channel incremented in the synchronous part of the method in response to a successfully issued SIO/SIOF. When the responding I/O interrupt (i.e. a successful start I/O interrupt) is later received, the CPU asynchronously executes the interrupt handler program which decrements the CAT counter for the successfully selected physical channel. In the left-hand path in FIG. 1 in which the device is not connected by the executed SIO/SIOF, no change is made to any CAT count.

When any I/O interrupt is handled (whether from a successful or unsuccessful connection), the method in FIG. 1 initiates controls for accessing the logical channel queue (LCH Q) (shown in FIG. 5, using the method shown in FIG. 4) which loops asynchronously back to the lowest count channel finding method that asynchronously executes a SIO/SIOF instruction in a next attempt to connect a device.

Each I/O interrupt initiates the LCH Q controls in an attempt to connect the highest priority I/O request (i.e. top entry) in the LCH Q, which may not be the request related to the I/O interrupt that initiated the current iteration of the LCH Q controls.

The entries in the LCH queues are in a sequence determined by I/O priorities of their represented requests, in which the I/O priorities are provided to the SCP for the various users of the system in the manner well known in the art.

Figure 2:
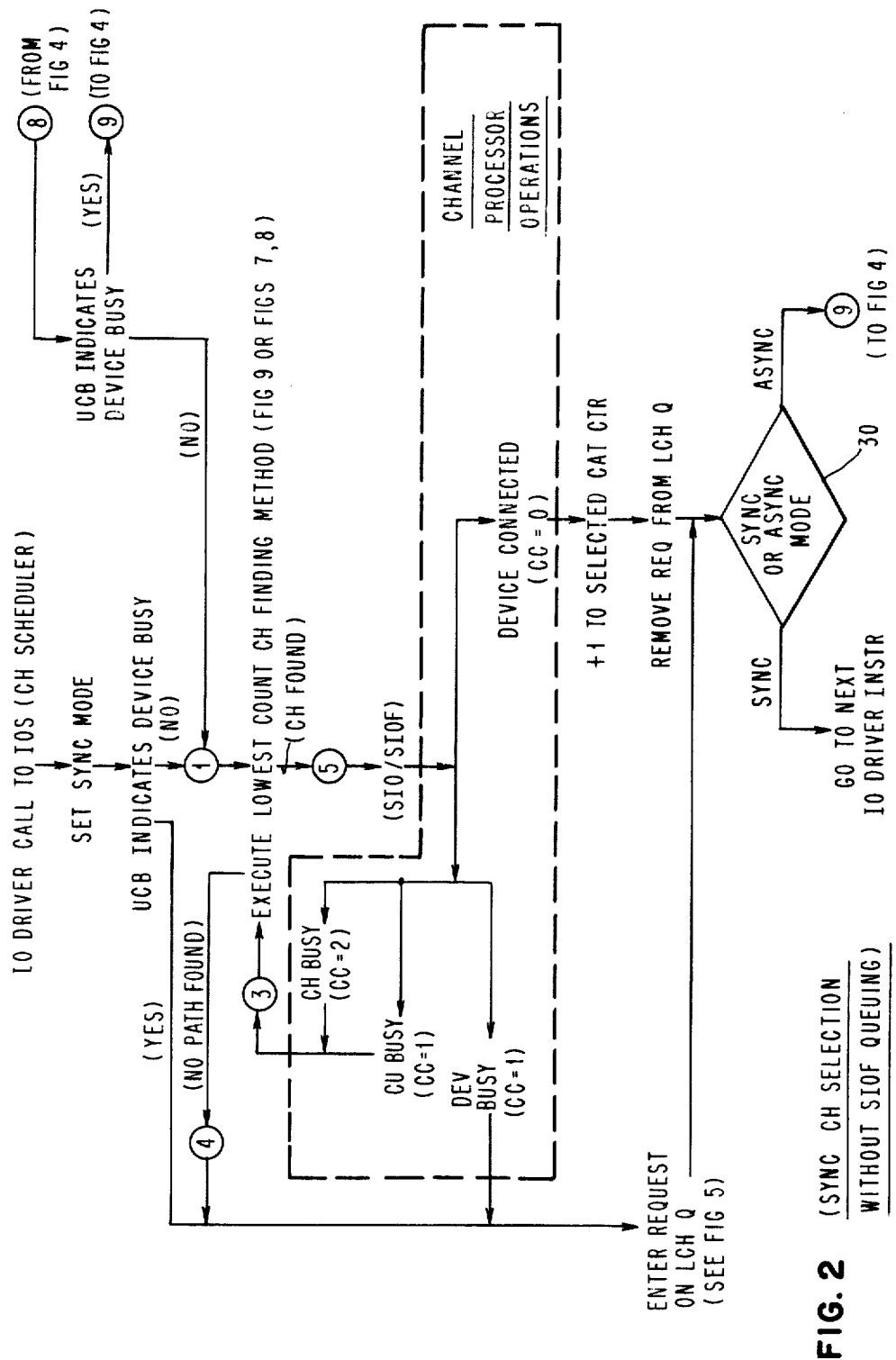
FIGS. 2 and 3 are specific flow diagrams of synchronous and asynchronous channel selection methods having the invention in a system control program being executed by a central processor (CPU) for finding a channel to connect an I/O device and for changing the channel request counts used in the channel finding process.
Figure 3:
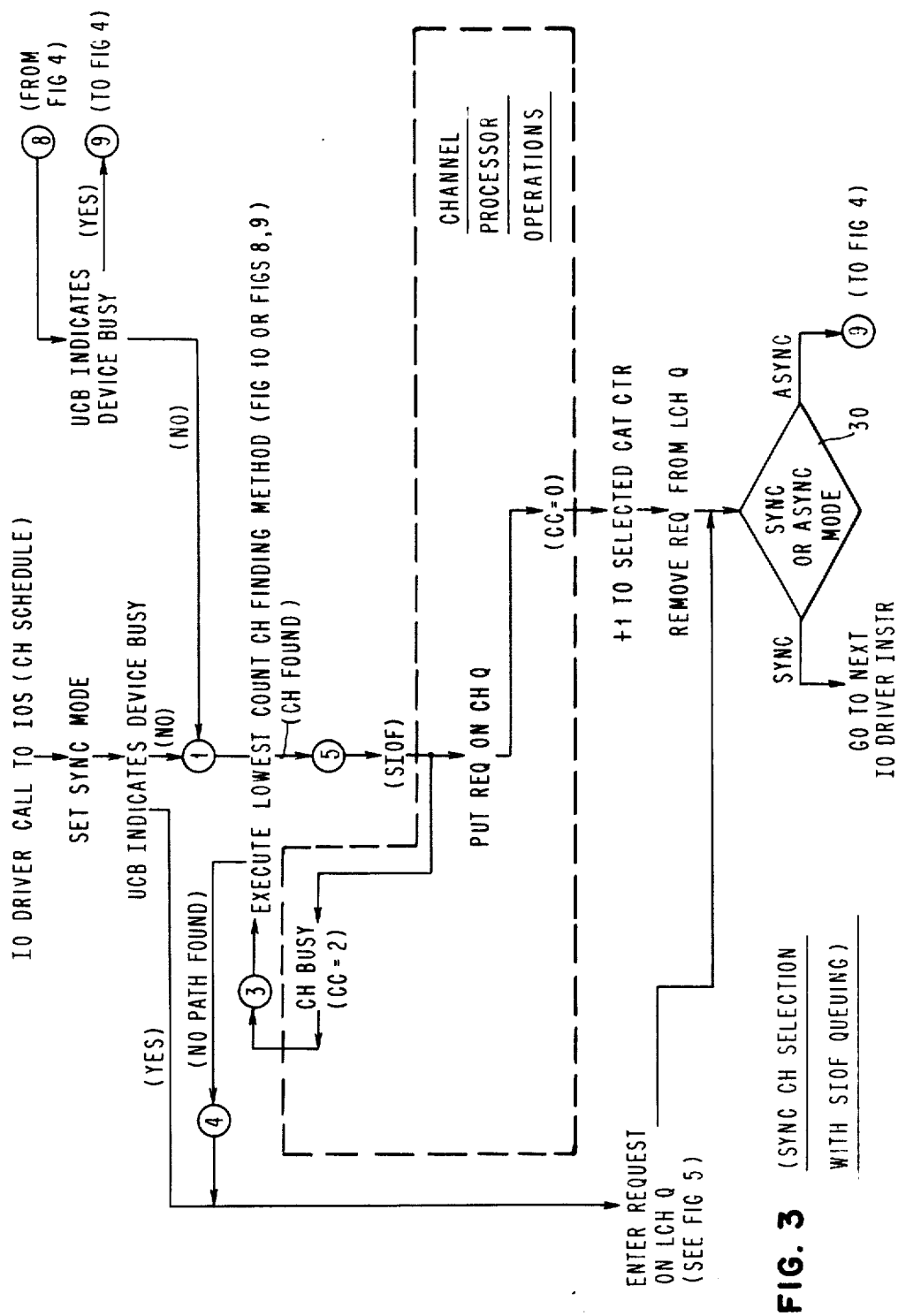
Figure 4:
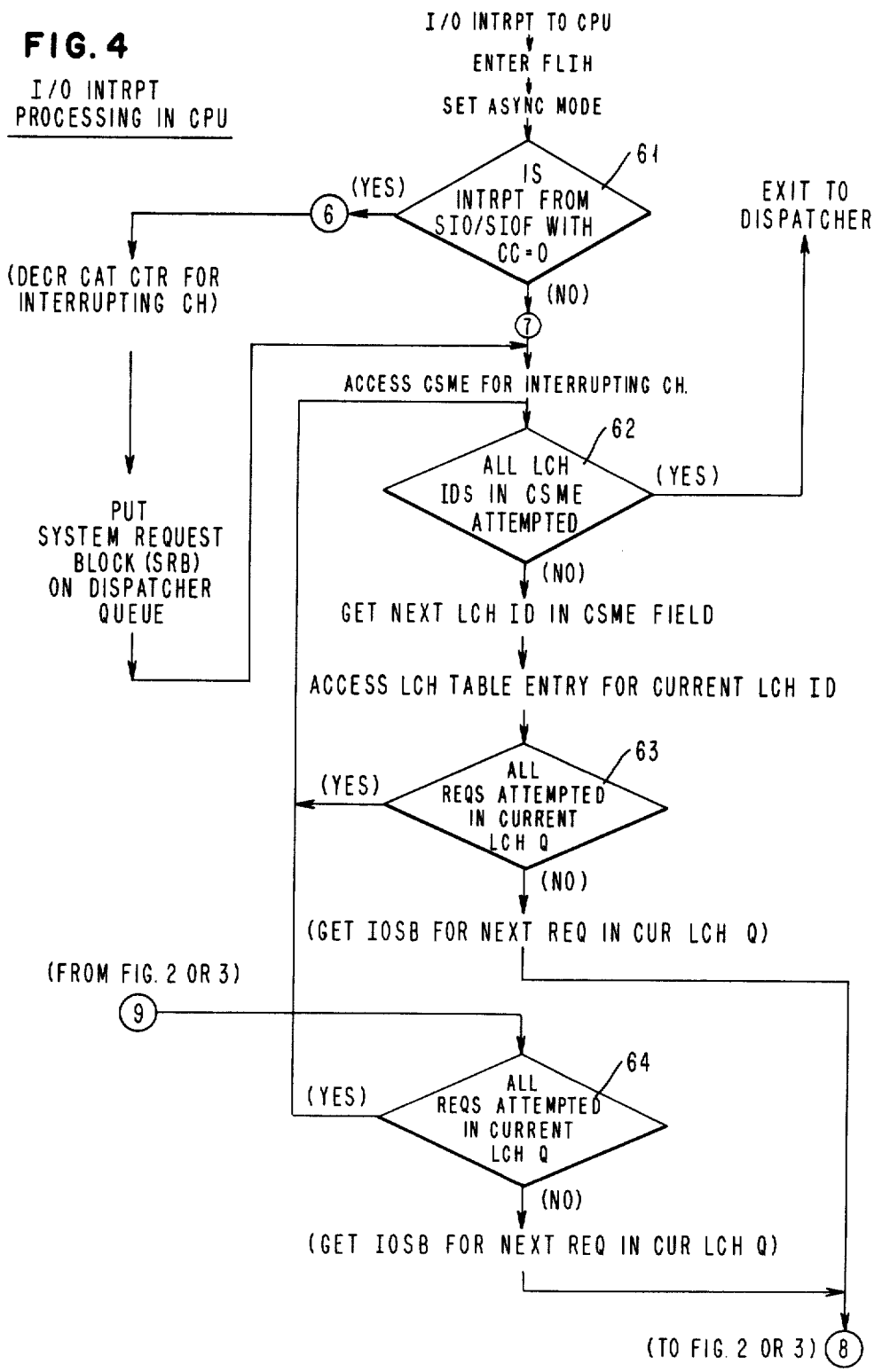
FIG. 4 is a specific flow diagram of asynchronous I/O interrupt processing in a CPU having the invention for decrementing channel request counts used in the channel finding processes.

The upper part of the method in FIG. 1 is shown in more detail in FIGS. 2 or 3, and the lower part of the method is shown in more detail in FIG. 4. FIG. 2 is applicable to SIO instruction execution for which no channel queuing is used. FIG. 3 is applicable to SIOF instruction execution for which channel queuing is used. Thus, whenever an I/O request is to be connected by the SCP, the method in FIG. 2 is used if the SCP will execute a SIO instruction, and the method in FIG. 3 is used if the SCP will execute a SIOF instruction. Step 4 sets a sync mode bit in an I/O control block to indicate synchronous state.

The methods in FIGS. 2 and 3 are essentially the same except for the choice of the SIO or SIOF instruction, and the internal channel processor operations. If a channel processor receives a SIOF command from a CPU, but does not have channel queuing, or is not prepared to use its channel queuing, then the SIOF command will be treated like a SIO command and the method in FIG. 2 is used rather than the SIOF method in FIG. 3.

The SCP uses an I/O driver routine with a branch instruction to call a channel scheduler routine within the I/O supervisor (IOS) program of the SCP.

Upon entering the method in FIGS. 2 or 3, a mode bit is set to either sync mode state, depending on whether the method is entered from (1) an original I/O request in the CPU instruction stream, or (2) an I/O interrupt being handled by the CPU.

Then in FIGS. 2 or 3, the channel scheduler checks a field 12D in the unit control block (UCB) in FIG. 5 for the requested device to determine whether the requested device is busy with a previous request. If the device is busy, the current request for the device is entered into the LCH queue for that device (see FIG. 5) and the new entry is chained into the LCH queue in its I/O priority order.

The next step in either FIGS. 2 or 3 includes entry into the novel method of finding an available physical channel with the lowest number of uncompleted I/O requests. If such available channel is found, an attempt is made to connect with such channel.

In FIGS. 2 or 3 for either SIO or SIOF, if the selected channel is busy, the request is entered on the LCH queue for the requested device. Later, connection attempts are made asynchronously in response to I/O interrupts, which cause the highest priority request on a LCH queue to be used to attempt to connect the device required by that request.

In FIG. 2 if the device is found to be busy during the execution of a SIO instruction (i.e. CC=1), the I/O request also is entered on a LCH queue. The issued SIO now determines if the device, its control unit (CU), and the selected channel are all non-busy and provides a condition code (CC) and channel status word (CSW) for indicating the non-busy or busy state of the requested path to the SCP. If the CU is found busy, the channel processor sends this information to the CPU (i.e. CC=1 and the CSW) and the CPU re-executes the lowest count channel finding method to find the lowest CAT count available channel then existing (which may be different from the channel found during the last iteration of this routine for the same I/O request) followed by re-execution of the SIO instruction with the ID of the last found channel. If no channel is found on the last iteration, the request remains on the LCH queue and awaits reactivation under LCH queue control by a future I/O interrupt. If the found channel is not busy but only the CU is busy, the communication between the channel processor and CPU causes the channel finding method to repeat and re-execute the SIO until a path is found available on single examination of all paths or the request is left on the LCH queue if all paths are busy.

In FIG. 3 for a SIOF instruction execution, if the selected physical channel is available, but the requested device or CU is busy, the I/O request is put on a channel queue for the selected physical channel, and the channel processor sends a CC=0 signal to the CPU which thereby assumes the device is connected and goes to its next instruction, even though in fact the device may not be connected. However, under SIOF operation, the channel processor accepts the responsibility for connecting the device and will connect it whenever the device and CU both become non-busy.

In either FIGS. 2 or 3 with either SIO or SIOF, as soon as the CPU receives a CC=0 signal from the channel processor, the CPU increments by one the CAT count for the physical channel used by the connected device, so that the CAT count is updated to include one more uncompleted request.

Then step 30 tests whether the mode currently indicates sync or async state. If it indicates sync state, the CPU goes to the next instruction in the I/O driver routine after the instruction which called the method in FIGS. 2 or 3. But if step 30 finds the async state indicated, the method in FIG. 4 is entered at step 64.

FIG. 4 indicates in more detail the asynchronous I/O interrupt processing by the CPU in response to each I/O interrupt initiating the execution of the first level I/O interrupt handler (FLIH) routine.

When exit 9 is taken from FIGS. 2 or 3, the asynchronous mode exists, and the interrupt handler routine in FIG. 4 is entered at step 64 in order to attempt to connect the devices requested by all outstanding I/O start requests currently in the LCH queue for the LCH containing that physical channel (CH) which initiated the last iteration through the method in FIGS. 2 or 3. These connect attempts are sequenced in the priority order of the I/O requests on that LCH queue.

In more detail, step 64 determines if that LCH queue is empty, e.g. when start pointer 14B contains an end of queue code. If not empty, the next request in the LCH queue is accessed starting the IOSB at the top of the LCH queue. The IOSB pointer in the accessed entry is used to access the IOSB of the request and then its UCB. Then exit 8 is taken from FIG. 4 to FIGS. 2 or 3 to examine the busy state indication for the requested device in the UCB. If the device is indicated to be busy, exit 9 is taken from FIGS. 2 or 3 back to FIG. 4 to skip the current LCH entry and get the next LCH entry in the same LCH queue. If from entry point 8 the device is indicated to be not busy, the method in FIGS. 2 or 3 enters the lowest-count channel finding method to find the physical channel most likely to be the most efficient physical channel to connect the device for this LCH request. If a channel ID is found by the LCH entry, it is put in a SIO or SIOF which is executed in an attempt to connect the device. If the device is connected, this I/O request is removed from the LCH queue, and step 42 takes exit 9 back to FIG. 4 to process the next request (if one exists) in the same LCH queue. If no available channel is found in the LCH, exit 4 is taken which puts the request back on the LCH queue.

This LCH connecting process is repeated until the end of the LCH queue is reached and all requests in the LCH queue have been attempted. Then the yes exit from step 64 is taken to step 62 which accesses the CSME field 26B in FIG. 6 in the CAT entry for the physical channel which issued the current interrupt being handled, in order to obtain the next LCH ID in the CSME (channel search module entry) field, so that all requests to this physical channel will have a connection attempt. That is, the physical channel is found in all logical channels having a LCH ID in this CSME field 26B.

The following CSME TABLE is an example of LCH identifiers in respective CSME fields in CAT1 in FIG. 6. They have the physical channel to logical channel relationships provided in the LCH TABLE previously disclosed herein.

CSME TABLE

| Physical Channel | LCH ID's In CSME Field |
| --- | --- |
| 0 | 0, 1 |
| 1 | 1, 2, 3, 6 |
| 2 | 3, 4, 5 |
| 3 | 5, 6, 7 |

Other physical channels having connection requests in a CSME set of LCH queues will also have connection attempts because they will be accessed by this embodiment. Therefore, using the next LCH ID, its LCH table entry is accessed, its LCH queue is entered, and each entry in that LCH queue is processed in the manner previously described for FIG. 4 and FIGS. 2 or 3 until all I/O requests have been tried in all LCH queues represented in the respective CSME field for the physical channel initiating the current interrupt processing.

In this manner, an attempt is made to connect all pending I/O requests in all LCH queues capable of using the physical channel which initiated the current interrupt processing. However, this processing may try to connect any of these requests using any other physical channel assigned to the respective LCH, since the lowest CAT count available channel is found for each LCH request even though the found channel is not the initiating channel. When all LCH queues in the accessed CSME field have been exhausted, an exit is taken to the SCP dispatcher routine to dispatch other work on the CPU.

Whenever a next I/O interrupt is received by the CPU, the interrupt handler routine in FIG. 4 will again be entered and set the asynchronous mode bit. Then step 61 is entered to again begin the asynchronous interrupt handler processing in the manner previously described. Step 61 determines whether the type of interrupt is (1) a successful start I/O interrupt, or (2) an unsuccessful start I/O interrupt. If step 61 determines the interrupt is the first type, its yes exit is taken to access the CAT counter field 26A in FIG. 6 for the initiating physical channel which then is decremented by a value of one. But if step 61 finds the interrupt is the second type, the no exit from step 61 is taken which skips the decrementing step.

Thus, the no exit from step 61 chooses the right-hand path in FIG. 1 and the yes exit from step 61 chooses the left-hand path in FIG. 1. In more detail, test 61 in FIG. 4 determines if the I/O interrupt (1) indicates a completion of a started I/O operation, or (2) indicates path component availability for an unsuccessful start I/O interruption. A completion type of I/O interrupt is indicated by a zero condition code, i.e. CC=0 when the SIO or SIOF instruction was executed with a zero deferred condition code. Upon receiving an I/O interrupt, the FLIH routine checks the CSW to determine if it is a successful or unsuccessful start I/O interrupt.

When this method decrements the CAT count field 26A for the related physical channel by taking the yes exit from step 61 in FIG. 4, the FLIH routine generates a system request block (SRB) and puts it into the dispatcher queue for a dispatcher future call to the I/O driver, and then the FLIH routine enters step 62 in FIG. 4.

The no exit from step 61 is taken to step 62 when an unsuccessful start type of interrupt is provided (which is sent to the CPU by the channel processor) when availability occurs for the channel, CU, or device which was busy at the time of executing a rejected SIO or SIOF instruction by then sending the CPU a non-zero CC indicating which of the CU, device or channel was busy.

The CPU receipt of an interrupt from an unsuccessful start I/O command does not cause any change to any CAT count.

The invention decreases the average access time for a CPU request for I/O data in an I/O record by modifying the CPU programs which find a physical channel path for the request, so that the CPU programs choose the most probably available physical channel path in a LCH. This channel choice reduces the probability of a RPS miss and thereby decreases wasted spins by the DASD as well as decreasing the access time that the requesting CPU program has to wait for the requested data.

With this invention, when a new I/O request is issued by the CPU, the first physical channel found by the invention for a connection try is the physical channel in the LCH with the fewest uncompleted requests, i.e. the smallest CAT count. If plural available channels in the LCH have the same CAT count, the tie can be broken by reverting to one of the old channel finding methods (e.g. last channel used), since any of the tied channels may arbitrarily be chosen. Also, if only one physical channel in a LCH is non-busy, the invention is more likely to choose it than another physical channel on the probability that the channel with the smallest number of uncompleted requests (i.e. smallest CAT count which may be zero) is the channel most likely to be in a non-busy condition.

This avoids failed attempts to connect channels which would be found to be busy, which would use the CPU and DASD resources in an unrewarding manner. Hence, this invention increases system efficiency by avoiding some of the failed connection attempts, which this invention reduces by initially finding the channel most likely to be non-busy.

Another advantage in this invention's use of the CAT count over prior methods is that the invention tends to balance the work load among plural channels in each LCH by finding the channel with the smallest current load (represented by the smallest CAT count) to perform the first connection attempt for a CPU I/O request, which also is the attempt most likely to succeed.

A desirable consequence of selecting the physical channel most likely to be available (i.e. smallest CAT count channel) is to reduce the average amount of CPU code executed per actual I/O connection. That is, the number of connection attempts per successful connection equals the number of failed attempts plus the final successful connection attempt. Therefore, if the number of unsuccessful connection attempts is reduced or eliminated, the amount of executed CPU code is correspondingly reduced. By balancing the workload on the channels, the method reduces the probability of an RPS miss. A RPS miss can easily occur after the DASD latency spin resulting in more lost time to access the requested data. This occurs if the channel or CU is unavailable to the device when the requested record is at the head. The DASD must spin around again, waiting for the record to approach the head again. At that time, there is still some chance that the channel or CU is unavailable, resulting in another RPS miss.

FIG. 3 differs from FIG. 2 in regard to the internals of the channel processor operations to support channel use of the SIOF instruction. With SIOF, the CPU can be released from waiting for the completion of the channel processor activity for an I/O start command. Thus, with SIOF, the CPU can be released to execute its next instruction as soon as the channel processor receives the I/O start command for a SIOF instruction executed by the CPU. Many current S/370 programs use SIOF instructions instead of SIO instructions for perhaps 99% of the I/O start requests. The effect of SIOF use is to allow the CPU to overlap program execution while the channel processor does the waiting for the requested device or CU to become non-busy. With the SIO instruction, the CPU must wait by subsequently repeating its SIO command until the device is connected.

With SIOF use, the CAT count is incremented even though the requested device is not connected due to the device and/or CU being busy when a CC=0 signal is returned, which does not happen with SIO use. Thus, with SIOF use, the CAT count for each physical channel equals its number of: (1) unconnected but accepted SIOF requests and (2) connected but uncompleted SIO and SIOF requests.

With SIO use, the CAT count for each physical channel only equals its number of: (1) connected but uncompleted I/O requests. For example, when only SIOF is used, the number of connected I/O requests may be 80% to 90% of the total number of accepted I/O requests represented in the CAT count for that physical channel. The result of SIOF use instead of SIO use is therefore to increase the average CAT count value by perhaps 10% to 20% over what the CAT count would be if only SIO were used.

Accordingly a consequence of the SIOF execution is to hide the busy conditions of the devices and CU from the system software, since device and CU busy conditions with a SIOF instruction are not directly observable to the CPU programming by condition code signalling. The method of this invention exploits the CAT count to make these SIOF busy conditions indirectly observable by the SCP software.

In summary, the invention improves the efficiency of CPU and channel operation with the SIOF instruction use under CAT count control, while without this invention the CPU and channel operation efficiency in the system would be degraded by failure of the prior methods to recognize lack of channel path availability due to lack of channel to CPU communication of the correct CU busy status.

Figure 8:
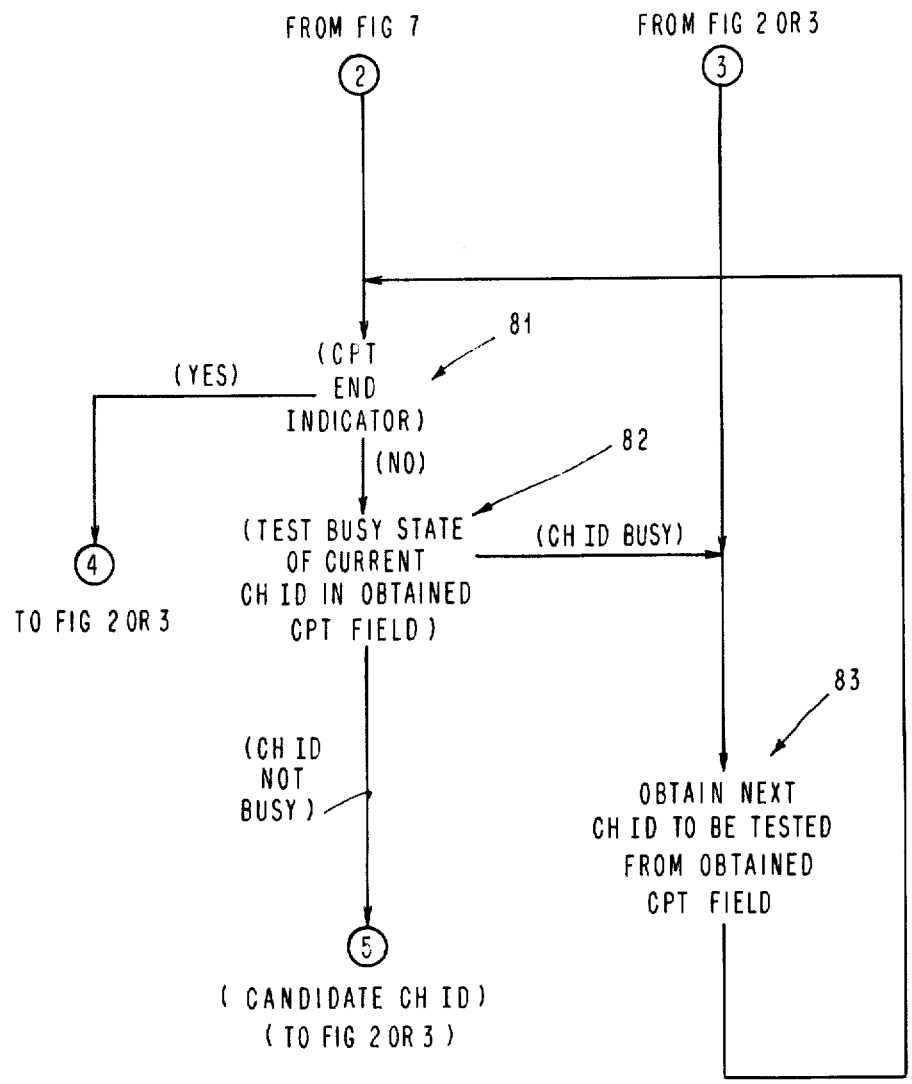
Figure 9:
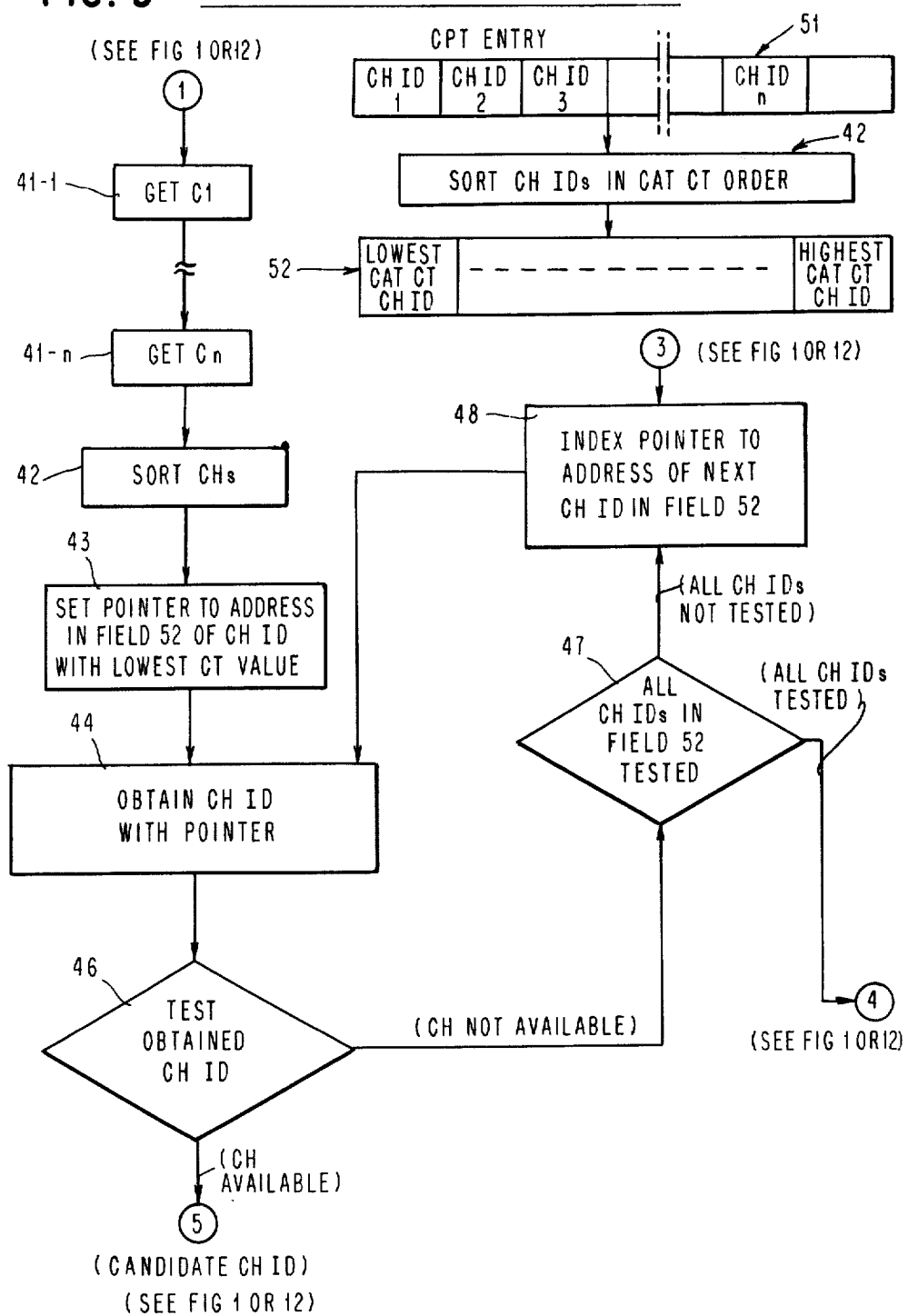
FIG. 9 is a detailed flow diagram of a generic method of the subject invention for finding the most efficient channel to connect an I/O device.

The method in FIG. 9, or in FIGS. 7 and 8 iterates for each next higher CAT count CH ID until a channel is found available or until all channels in the LCH have been found unavailable.

The method shown in FIG. 9 is the general method of the invention. It represents the situation in which each CPT entry 51 may contain any number of physical channel IDs assigned to a given LCH. The CH ID1 through CH IDn in the CPT entry respectively index the CAT count (C) fields 26A in FIG. 6 (designated as C1 through Cn), which are accessed by the steps 41-1 through 41-n in FIG. 9. Then step 42 sorts the CH IDs into CAT cound order into field 52 in which the lowest count channel is indicated at the left end of the sequence and the highest count channel is indicated at the right end of the sequence. Then step 43 sets a channel finding pointer to the lowest count CH ID which is at the leftmost end of field 52. Next step 44 accesses the left-most CH ID with the pointer, and step 46 tests if that CH ID is available. If that channel is available, it is provided as the candidate for attempting to connect the device to the found channel path at exit 5 in FIG. 9 which corresponds to point 5 in FIGS. 1 or 12. If step 46 finds that channel is not available, step 47 tests if all CH IDs in the LCH have been tested for availability.

If step 47 finds no CH ID is available, exit 4 is taken to point 4 in FIGS. 1 or 12 to enter the request on the device's LCH queue. If all have not been tested, step 48 is entered to index the channel finding pointer to the next higher CAT count CH ID in field 52. Then step 44 is again executed to obtain that CH ID.

The result of the method in FIG. 9 is that an I/O request is connected with the candidate physical channel having the lowest CAT count among all currently available channels in the LCH. The candidate channel is most likely to be non-busy when the disk rotates the requested record beneath the head to read or write the requested record, which may occur substantially later when the disk latency time expires.

FIGS. 7 and 8 together illustrate a lowest count channel method of the type previously described in FIG. 9 which is implemented in released IBM MVS/SP Release 3 which was made publicly available in August 1981 including the source listing of its code by International Business Machines Corporation.

The method in FIGS. 7 and 8 use the CPT entry format 17 in which each CPT entry represents a respective LCH which may contain up to two physical channel identifiers, i.e. CH IDA and CH IDB. The pair of channel ID's in a CPT entry are represented in two different fields in reverse order, in which each field is bounded by an end indicator. The CH IDs are sorted in CH ID order (not in CAT count order) in each field. A flag field not pertinent to this invention is located between the forward and backward CPT fields. Thus, the forward CPT field 17A contains CH IDA, followed by CH IDB, followed by the end indicator. The backward CPT field contains first the CH IDA, followed by CH IDB, followed by an end indicator.

In FIG. 7 (as also found in the case of FIG. 9), each CH ID found in the CPT field 17A and 17B also has an associated CAT count field (C) in the respective CH ID entry in the channel availability table (CAT) shown in FIG. 6 for the channel set associated with the respective processor. That is, a respective CAT count is accessed using the CH ID accessed in the respective CPT entry as an index in the CAT table.

Accordingly, the method in FIG. 7 is entered from entry point 1 in FIGS. 2 or 3, and its first step 53-A gets the CAT entry count (CA) for CH IDA in the forward CPT field 17A. Then step 53-B gets the CAT entry count (CB) for CH IDB in the forward CPT field 17A. Then step 54 compares counts CA and CB.

Next, a test 55 is made on the comparison. If step 55 determines count CA is greater than count CB, then CB is smallest and step 57 is entered which obtains the pointer to the backward CPT field 17B to access its CH IDB subfield, which is outputted at exit 2 to FIG. 8. On the other hand, if step 55 does not find CB the smallest, then step 56 is entered.

Step 56 determines if CA is equal to CB. If they are not equal, then CA is smallest and step 58 is entered to obtain the pointer to the forward CPT field 17A in which the first subfield contains CA IDA, which is provided as the output to exit 2 for FIG. 8.

However, if step 56 finds the compared values equal, then step 59 is entered which may contain any type of technique for selecting either of the two CH ID. In FIG. 7, step 59 uses the rather simple technique of obtaining the CH ID in the last used channel (LUC) field in the UCB in FIG. 5. Then step 59A compares the LUC CH ID to CH IDA and CH IDB to determine which one was the last CH ID used. Then step 57 or 58 is again entered depending on whether CH IDA or CH IDB is the LUC CH ID. The pointer to the selected CH ID is the CH ID outputted at exit 2 to FIG. 8.

The submethod in FIG. 8 operates with the submethod in FIG. 7 to find the physical channel on which a device connection operation will be tried. In FIG. 8, entry point 2 receives the CH ID provided from FIG. 7 exit 2 and step 81 tests it to determine whether it is an end indicator in the CPT field. If it is an end indicator, then exit 4 is taken to FIG. 2 or 3 since it is determined that no physical channel in the LCH is available, so that the SCP then puts the request onto the LCH queue for the requested device.

However, if the current field is not an end indicator, then the next step 82 tests the availability of that CH ID with a test channel (TCH) instruction to determine its busy state. If this current CH ID is not busy (i.e. available), then it is the candidate CH ID provided to exit 5 which is taken to FIGS. 2 or 3 wherein the channel scheduler routine issues a SIO or SIOF instruction to attempt a connection.

However, if the current CH ID is found to be busy by step 82, then the next step 83 obtains the next subfield in the respective CPT field 17A or 17B, and loops back to step 81 to test whether the next obtained subfield contains a CH ID or an end indicator.

Then step 82 tests this second obtained CH ID to determine if its channel is available. If it is available, then it will be the candidate CH ID for a connection attempt by passing it from exit 5 to FIG. 2 or 3 so that the channel scheduler can execute a SIO or SIOF instruction to try to connect the requested device.

Accordingly, the submethod in FIG. 8 corresponds to the submethod part of FIG. 9 which has the loop back from step 46 through step 48 to step 44, in order to find the lowest CAT count available channel as the candidate channel, even though it may not be the lowest CAT count of all physical channels in the LCH. The finding of a candidate CH ID with a CAT count greater than the absolute lowest CAT count CH ID improves the efficiency of the system, since it may obtain earlier connection of the requested device than having to wait for the absolute lowest count channel to become available.

FIGS. 12 and 13 illustrate how the invention can be embodied entirely in a channel processor. That is, in FIG. 12, all of the steps of the method between the dashed lines D and E are executed in channel processor. Control blocks of the type shown in FIG. 5 continue to exist, and they may exist in a local storage of the channel processor or in a systems area in the main storage 37 which is addressable by a control program being executed by the channel processor but is not addressable by CPU application programs or CPU system control programs. However, channel program 10 remains in the normal area of main storage which is addressable by CPU system control programs.

The logical channel (LCH) queues (located by entries in LCH table 13 in FIG. 5), are now solely handled by the channel processor control program and/or by channel processor hardware, rather than by the CPU SCP. The channel controlled LCH queues in FIGS. 12 and 13 are therefore referred to as channel LCH queues. Thus, the entries in each channel LCH queue are entered and removed by the channel processor.

The channel availability table (CAT) shown in FIG. 6 is therefore controlled by the channel processor in FIG. 12, but the channel-controlled CAT table may have a different relationship to the data processing system, such as: (1) a single CAT may be provided globally for all channel paths in all channel processors in the system whether the system is a uniprocessor or multiprocessor system, or (2) a CAT may be provided local to each channel processor in the system and there will be plural CATs if there are more than one channel processor in a system (such as in a MP system). The content of CPT entry 51 in FIG. 5 and CAT entry 26 in FIG. 6 may be the same as previously discussed.

An overall channel control method is shown in FIG. 12 in which the channel processor receives an I/O request from the CPU, which may be called a start subchannel command. Subchannels are representations of the respective I/O devices in the system. The start subchannel command specifies the device to be connected but does not specify the channel path or CU to be used, which is left to the channel processor to determine. The operations of the channel processor are considered asynchronous with respect to the CPU operations.

In FIG. 12, the lowest count channel finding method (discussed in regard to FIG. 9) is initiated by the channel processor by a received start subchannel command in an attempt to find the lowest CAT count available channel path to the device identified in the start subchannel command. If the channel finding method finds all paths are busy to the request device, then the channel processor puts the request on a channel LCH queue. The channel processor may have one or more LCH queues.

After an entry is entered into a channel LCH queue, the channel processor is put into an idle state, in which it waits for an initiating operation by a CU or device completion status signal or by another CPU I/O request.

If the channel finding method finds a candidate channel path, the channel attempts to connect the device to the candidate channel path by doing the equivalent of what was previously described for the execution of an SIO or SIOF instruction. However, in this channel-controlled embodiment, there is no SIO or SIOF instruction used, since those instructions are CPU instructions that also designate a channel path and control unit, which in FIGS. 12 and 13 are selected only by the channel processor (and not by the CPU as is done with the SIO or SIOF instructions). The only CPU requirement in FIGS. 12 and 13 is to designate the device ID, which is done by a CPU start subchannel instruction. The channel paths in the channel processor of FIG. 12 are equivalent to the channel paths previously discussed in relation to FIG. 1 as being found in a channel processor.

In FIG. 12, a successful channel path connection assigns a path through the channel processor from the requested device to main storage; and the method then increments the CAT count for the related CH ID (identifying the assigned channel path).

Once a device is connected, then an unknown amount of time will elapse before the I/O operation is completed for this device. Device access completion, as well as other device and CU information, is signalled by the device or control unit (CU) in the system by sending the channel processor the various types of I/O operation status signals. This signalling is done in the conventional manner of I/O control units currently in commercial use to their channel processors by sending I/O status signals to represent when an I/O operation reaches a successful or unsuccessful completion. The status signals indicate to the channel processor the particular control unit ID and device ID which is responding. The channel processor correlates the CU completion status signals with its outstanding I/O requests to determine which I/O request is being responded to and whether the request was successful or unsuccessful.

If the response indicates the completion of a successful connection, the channel processor decrements the CAT count for this channel path ID. The channel processor also generates an I/O interrupt signal and sends it to the CPU along with status signals representing the status of the operation for the requested device, so that the CPU can recognize that the requested data is now available in main storage 37 for CPU use. Then the channel processor uses entry point 12 in FIG. 12 to access its channel LCH queue controls, which are shown in detail in FIG. 13.

On the other hand when the channel processor attempted to connect the device to the candidate channel path, it may not have been able to make the connection due to either the CU or the device being busy, even though the found channel is not busy. Accordingly, the device is not connected and no CAT count is incremented. The channel processor again invokes the channel finding method to find the next lowest count available channel path as the candidate path, and attempts to make a connection to the device via that channel path on the theory that it may connect to the requested device through a different control unit which might not be non-busy at that particular time. If after no path in the channel CPT entry is found to be available, then the request is entered on a channel LCH queue, and the channel is put into its idle state.

With each failed attempt to connect a candidate path with the requested device, the control unit or device that signalled a busy status later generates a responding status signal which is sent to the channel processor to indicate that the requested CU or device is no longer busy. There is no CAT count decremented or otherwise changed at this time, but the channel processor uses entry point 13 to enter the LCH queue control which is executed by the channel processor.

Whenever the channel processor LCH queue control is initiated, it operates similarly to the LCH queue control previously described for FIG. 4, except that the process in FIG. 13 is performed entirely by the channel processor while the process in FIG. 4 is performed by the CPU. In a like manner, the process in FIG. 13 will access each entry in the current channel LCH queue beginning with the entry at the start of the queue. An attempt is made to connect the request in each entry in the queue until all entries have had an attempted connection, which may or may not have been successful. Then the next channel LCH queue ID is obtained from the CSME field in the CAT entry for the current CH ID, and the same process is done with respect to all entries in it, etc., until an attempt has been made to connect all entries for all channel LCH queues represented in that CSME.

In more detail in FIG. 13, each time CU status signals are received by the channel processor, step 91 tests the status signals to determine if they indicate the completion of a successful connection assignment for a particular request, or merely indicate that a requested CU or device is no longer busy due to a failed connection request. This is done by the channel processor status handler program which analyzes the status signal received from all CUs to analyze their meaning.

If test step 91 determines that a status signal indicates a successfully completed connection, it takes its yes exit to decrement the CAT count for the completing channel path ID. Then the channel processor generates an I/O interrupt signal which it sends to a CPU, which will handle that interrupt for the SCP. Then the CSME field in the current CAT entry 26 is obtained, and step 92 examines the CSME field to determine whether all channel LCH queues having IDs in that field have had all of their requests attempted to be connected. If yes, then an exit is taken from the process, whereby the channel processor is put in an idle state awaiting its next CPU request or an I/O status signal from a CU.

If step 92 finds that all requests in the current channel LCH queues have not been handled for the CSME field, then the next channel LCH ID is obtained from the CSME field. Step 93 tests the current channel LCH table entry to determine if all requests on the current channel LCH queue have been attempted. If no, then the process gets the next I/O request from the current LCH queue and then takes exit 14 to FIG. 12 which causes an interation back through the method in FIG. 12 via a path having entry 11 back into the process in FIG. 13 which does not involve any status signalling from any CU.

Thus, when entry 11 is taken to FIG. 13, step 94 tests to determine if all requests on the current channel LCH queue have been handled. If not, the process iterates via exit 14 and entry 11 for each request in the queue until all requests in the current LCH queue have been attempted. The yes exit is taken from test 94 to test 92 to determine if any other channel LCH queue exists in the CSME field for the initiating channel path for which a connection attempt should be made. If more channel LCH queues exist then the process repeats for each channel LCH queue in the manner previously described until all requests in all queues identified in the CSME have been attempted.

An example of IBM System/370 program code for the described S/370 channel finding method is provided in the following pages which are taken from the publically available listing for program modules IECVLCHA and IECIOSAM in IBM program product no. 5740-XYN entitled "MVS System Product Release 3".

The title page of each module is included with its copyright notice.

Module IECVLCHA entitled "IOS Channel Selection Algorithms" provides exemplary program code for the balanced channel finding method found in the CPU embodiment of this invention. Pages 27, 29 and 30 define the control blocks shown in FIGS. 5 and 6, and page 33 provides code for the embodiment in FIG. 7.

Pages 207 and 262 in module IECIOSAM entitled "Input/Output Supervisor" provide exemplary program code surrounded by respective boxes for respectively incrementing and decrementing the CAT counts found in the CPU embodiment of this invention.

```
LOC  OBJECT CODE    ADDR1 ADDR2  STMT   SOURCE STATEMENT                                              XFMLC0202  16.49  11/04/81
                                   2   ***********************************************************         00002050
                                   3   *                                                           *         00003050
                                   4   *   MODULE NAME = IECVLCHA                                  *         00004050
                                   5   *                                                           *         00005050
                                   6   *   DESCRIPTIVE NAME = IOS CHANNEL SELECTION ALGORITHMS     *         00006050
                                   7   *                                                           *         00007050
                                   8   *   COPYRIGHT =                                             *         00008050
                                   9   *     5740-XYN COPYRIGHT IBM CORP 1977, 1981;               *         00008100
                                  10   *     LICENSED MATERIAL-PROGRAM; PROPERTY OF IBM;           *         00008250
                                  11   *     REFER TO COPYRIGHT INSTRUCTIONS FORM NUMBER           *         00008350
                                  12   *     G120-2083.                                            *         00008450
                                  13   *                                                           *         00009050
                                  14   *   STATUS = OS/VS2 JBB1326                                 *         00010000
                                  15   *                                                           *         00011050
                                  16   *   FUNCTION = PROVIDES THE ALGORITHMS WHICH SELECT THE CHANNEL *     00012050
                                  17   *              TO TRY FIRST ON A START I/O OPERATION WHEN THERE *     00012550
                                  18   *              IS MORE THAN ONE CHANNEL TO CHOOSE.          *         00013050
                                  19   *                                                           *         00015050
                                  20   *   NOTES = NONE                                            *         00021650
                                  21   *                                                           *         00022200
                                  22   *   DEPENDENCIES = THE ROTATE ALGORITHM REQUIRES ALL CHANNEL *        00022800
                                  23   *                  SETS TO HAVE ADDRESSES OF 0 OR 1.        *         00024050
                                  24   *                                                           *         00025250
                                  25   *   RESTRICTIONS = ENTRY POINT IECVLCHA MUST SPECIFY OFFSET *         00025450
                                  26   *                  ZERO OF THE TABLE CONTAINING THE ALGORITHM *       00026050
                                  27   *                  ADDRESSES.                               *         00027050
                                  28   *                                                           *         00028050
                                  29   *   REGISTER CONVENTIONS = SEE REGISTER EQUATES             *         00029050
                                  30   *                                                           *         00030050
                                  31   *   PATCH LABEL = IOSPATCH IN MODULE IECIOSCN               *         00031050
                                  32   *                                                           *         00032050
                                  33   *   MODULE TYPE = PROCEDURE                                 *         00033050
                                  34   *                                                           *         00034050
                                  35   *   PROCESSOR = ASSEMBLER                                   *         00035000
                                  36   *                                                           *         00035650
                                  37   *   MODULE SIZE = APPROX. 170 BYTES                         *         00036250
                                  38   *                                                           *         00036850
                                  39   *   ATTRIBUTES = REENTRANT, REFRESHABLE, KEY 0,             *         00038050
                                  40   *                NUCLEUS RESIDENT                           *         00039050
                                  41   *                                                           *         00040050
                                  42   *   ENTRY POINTS = IECVLCHA - TABLE OF ADDRESSES FOR THE    *         00041050
                                  43   *                  FOLLOWING ALGORITHMS:                    *         00042900     @G81RPLK
                                  44   *                  SEQ - SEQUENTIAL ALGORITHM               *         00043400     @D1A
                                  45   *                  LCU - LAST CHANNEL USED ALGORITHM        *         00044050
                                  46   *                  ROTATE - ROTATE ALGORITHM                *         00045050
                                  47   *                  RSEQ - REVERSED SEQUENTIAL ALGORITHM     *         00046050
                                  48   *                  BALANCE - CHANNEL BALANCE ALGORITHM      *         00047050
                                  49   *                                                           *         00048050
                                  50   *   PURPOSE = SEE FUNCTION                                  *         00050000
                                  51   *                                                           *         00060050
                                  52   *   LINKAGE = BALR R14,R15                                  *         00070050
                                  53   *                                                           *
                                  54   *   INPUT = REGISTER  1 = CHANNEL SET TABLE ENTRY ADDRESS
                                  55   *           REGISTER  7 = UCB PREFIX ADDRESS
                                  56   *           REGISTER 10 = CHANNEL PATH TABLE ADDRESS
```

```
LOC    OBJECT CODE    ADDR1 ADDR2  STMT   SOURCE STATEMENT                                    XFMLC0202 16.49 11/04/81

2309          IECDCAT  ,                                          @L1C  01640000
000000                              2310+         DSECT                                                     00200000
000000                              2311+CAT      DS    0F                                                  00250000
                                    2313+**%CATPLS1:;                                                       00350000
                                    2314+**/* ******************************************************** */  00400000
                                    2315+**/*                                                           */  00450000
                                    2316+**/*         5740-XYN COPYRIGHT IBM CORP 1980,                 */  00458300
                                    2317+**/*         LICENSED MATERIAL-PROGRAM, PROPERTY OF IBM,       */  00466600
                                    2318+**/*         REFER TO COPYRIGHT INSTRUCTIONS, FORM NUMBER      */  00474900
                                    2319+**/*         G120-2083.                                        */  00483200
                                    2320+**/*                                                           */  00491500
                                    2321+**/*  THIS DSECT DESCRIBES AN ENTRY IN THE CHANNEL AVAILABILITY*/  00500000
                                    2322+**/*  TABLE. THE TABLE IS CHANNEL SET RELATED AND RESIDES IN SQA*/ 00550064
                                    2323+**/*  EACH PHYSICAL CHANNEL IN THE CHANNEL SET CONTAINS AN ENTRY*/ 00580064
                                    2324+**/*  IN THE CAT AND IS INDEXED BY THAT CHANNEL NUMBER. THE ENTRY*/00650064
                                    2325+**/*  CONTAINS THE CHANNEL ID, CHANNEL STATUS, AND CHANNEL     */  00700064
                                    2326+**/*  STATISTICS.                                              */  00750064
                                    2327+**/*  MODIFICATIONS ARE SERIALIZED VIA DISABLED STATE          */  00800064
                                    2328+**/*  IN THE CPU CONNECTED TO THIS CAT'S CHANNEL SET.          */  00850064
                                    2329+**/*                                                           */  01050000
                                    2330+**/* FLAG REASON   PRODUCT DATE  ORIG. COMMENTS                */  01062500
                                    2331+**/* @L1= IOQUING ,JBB1326,800529,PDLN: BUSY HANDLING BY CHANNEL*/ 01075000
                                    2332+**/*                                                           */  01087500
                                    2333+**/* ******************************************************** */  01100000
                                    2334+**%       GOTO CATPLS2;                                            01150000
                                                   /*
000000                              2336+CATFLG    DS    XL1             CAT ENTRY FLAG BYTE                01250064
         00080                      2337+CATRES1   EQU   X'80'           RESERVED                           01300000
         00040                      2338+CATNOP    EQU   X'40'           CHANNEL NOT OPERATIVE              01350000
         00020                      2339+CATNGEN   EQU   X'20'           CHANNEL NOT SYSGENNED              01400000
         00010                      2340+CATNCPU   EQU   X'10'           CHANNEL NOT ON THIS CPU            01450000
         00008                      2341+CATNID    EQU   X'08'           CHANNEL ID (CATCHID) INVALID       01500000
         00004                      2342+CATFLG5   EQU   X'04'           RESERVED                           01550000
         00002                      2343+CATFLG6   EQU   X'02'           RESERVED                           01600000
         00001                      2344+CATDSABL  EQU   X'01'           CHANNEL DISABLED         @ZA30350  01650064
000001                              2345+CATFLA    DS    XL1             IOS FLAG BYTE                      01700000
         00080                      2346+CATBSY    EQU   X'80'           CHANNEL BUSY                       01750000
         00040                      2347+CATIORST  EQU   X'40'           CHAN NEED I/O RESTART    @G552PLM  01770055
         00020                      2348+CATCCRST  EQU   X'20'           CHAN ERR ON I/O INTERRUPT @G51BPLM 01800064
         00010                      2349+CATMCRST  EQU   X'10'           CHAN ERR ON MACH CHK INTRPT @G51BPLM 01810051
         00008                      2350+CATSOL    EQU   X'08'           SIO CC=0 DONE             @ZA30350 01820064
         00007                      2351+CATFLARS  EQU   X'07'           RESERVED                  @ZA30350 01830064
000002                              2352+CATSIOCT  DS    XL2             CHANNEL SIO COUNT                  01840064
000004                              2353+CATCHID   DS    0XL4            CHANNEL ID                         01850064
000004                              2354+CATTYPE   DS    0XL1            CHANNEL TYPE (4 BITS ONLY) @G64APLK 01860064
000004                              2355+CATMODEL  DS    XL2             CHANNEL MODEL NUMBER      @G64APLK 01870064
000006                              2356+CATIOELL  DS    XL2             IOEL LENGTH               @G64APLK 01880064
000008                              2357+CATCHQLN  DS    XL1             CHANNEL QUEUE LENGTH      @G874PLQ 01890064
000009                              2358+          DS    XL1             RESERVED                     @L1C  01892500
00000A                              2359+CATIOCNT  DS    H               ACTIVE I/O COUNTER           @L1A  01895000
00000C                              2360+          DS    XL4             RESERVED                     @L1A  01897500
         00004                      2361+CATELP2   EQU   4               ENTRY LENGTH IN POWERS OF 2 @G64APLK 01900064
         00010                      2362+CATEL     EQU   *-CAT           CHANNEL TABLE ENTRY LENGTH          01930064
         00010                      2363+CATDIM    EQU   16              NUMBER OF CAT ENTRIES IN THE FULL   02010064
```

```
LOC    OBJECT CODE    ADDR1 ADDR2  STMT   SOURCE STATEMENT                                              XFMLC0202 16.49 11/04/81 aLIP 01668000
000000                              2366          IECDCPT ,                                                             00006050
                                    2367+CPT      DSECT

2359+***********************************************************                   00010050
                                    2370+**                                                          **                00012050
                                    2371+**       CHANNEL PATH TABLE (POINTED TO BY LCH FIELD LCHTCH) **                00014050
                                    2372+**                                                          **                00016050
                                    2373+***********************************************************                   00018050

000000                              2375+CPTFIRST DS    0H              CHANNEL PATH TABLE                              00022050
000000                              2376+CPTPCHAN DS    H               PRIMARY CHANNEL ENTRY                           00024050
000002                              2377+CPTSCHAN DS    H               SECONDARY CHANNEL ENTRY OR TERMINATOR OF        00026050
                                    2378+**                             *X'FFFF' IF NO ALTERNATE CHANNEL                00028050

2380+**       THE FOLLOWING FIELDS EXIST ONLY IF AN ALTERNATE CHANNEL WAS           00032050
                                    2381+**       SPECIFIED VIA 'OPTCHAN' DURING SYSGEN                                 00034050
000004                              2382+CPTEND1  DS    H               TERMINATOR OF X'FF00'                           00036050
000006                              2383+CPTSWTCH DS    2XL1            SWITCH BYTES INDEXED BY CPU ADDRESS             00050050
                                    2384+**                             *AND USED BY CHANNEL ROTATE ALGORITHM           00100050
            00088                   2385+CPTSWBIT EQU   X'88'           USED TO FLIP CPTSWITCH                          00150050

000008                              2387+CPTSEC   DS    0H              ROTATED CHANNEL PATH TABLE                      00250050
000008                              2388+CPTSCHN2 DS    H               SAME AS CPTSCHAN                                00300050
00000A                              2389+CPTPCHN2 DS    H               SAME AS CPTPCHAN                                00350050
00000C                              2390+CPTEND2  DS    H               TERMINATOR OF X'FFFF'                           00400050

2392+** THE FOLLOWING MAPS A CHANNEL PATH TABLE ENTRY                               00500050

000000                              2394+CPTE     DSECT
000000                              2395+CPTENTRY DS    0H              CPT ENTRY                                       00600050
000000                              2396+CPTCHAN  DS    XL1             PHYSICAL CHANNEL NUMBER OR FF TERMINATOR        00650050
000000                              2397+CPTFLAGS DS    XL1             FLAG BYTE                                       00700050
     000F0                          2398+CPTSELSC EQU   X'F0'           BYTE MULTIPLEXER SELECTOR SUBCHANNEL NO.        00750050
     00008                          2399+CPTPPATH EQU   X'08'           PRIMARY CHANNEL SPECIFIED BY CPTCHAN            00800050
     00004                          2400+CPTSPATH EQU   X'04'           SECONDARY CHANNEL SPECIFIED BY CPTCHAN          00850050
     00003                          2401+CPTRESV  EQU   X'03'           RESERVED                                        00900050
     00002                          2402+CPTELEN  EQU   L'CPTENTRY      'SINGLE ENTRY LENGTH                            00950050
                                                                                                                        01000000 aLIA 01684000
                                    2404          IECDCST ,
                                    2406+*/***********************************************************/               00350064
                                    2407+*/*                                                          */               00400064
                                    2408+*/*      THIS MACRO DSECT DESCRIBES THE IOS CHANNEL SET TABLE.*/               00450064
                                    2409+*/*      ONE ENTRY EXISTS FOR EACH OF UP TO 16 CHANNEL SETS.  */               00500064
                                    2410+*/*      THE CHANNEL SET ID IS USED TO INDEX TO THE PROPER ENTRY.*/            00550064
                                    2411+*/*      THE CST IS POINTED TO BY THE CVT (CVTCST) AND IOCM (IOCMCST).*/       00600064
                                    2412+*/*      SERIALIZATION IS OBTAINED BY BEING DISABLED ON THE PROCESSOR*/        00610064
                                    2413+*/*      WHICH HAS CONTROL OF THE CHANNEL SET WHOSE ENTRY IS BEING  */         00620064
                                    2414+*/*      MODIFIED.                                           */                00630064
                                    2415+*/*                                                          */                00650064
                                    2416+*/***********************************************************/                00700064
                                    2417+*        %GOTO CSTPLS2;                                                        00750064
```

```
LOC    OBJECT CODE      ADDR1 ADDR2  STMT    SOURCE STATEMENT                                              XFMLC0202  16.49  11/04/81

000000                               2419+CSTE     DSECT                                                                       00900064
                                     2420+*                     MAP OF A SINGLE CST ENTRY           *                          00950064
000000                               2421+        DS    0F                    SINGLE ENTRY                                     01000064
000000                               2422+CSTCATP  DS    A                    ADDRESS OF CHANNEL AVAILABILITY                  01250064
                                     2423+*                                   TABLE (CAT).                                     01300064
000004                               2424+CSTIOM   DS    F                    CURRENT VALUE FOR CONTROL REG 2                  01400064
000008                               2425+CSTSCDP  DS    A                    ADDRESS OF STATUS COLLECTION DATA                01450064
                                     2426+*                                   AREA (SCD)                                       01500064
00000C                               2427+CSTIOWRK DS    A                    ADDRESS OF CHANNEL SET RECOVERY                  01550064
                                     2428+*                                   WORK AREA                                        01600064
000010                               2429+CSTCPU   DS    H                    PHYSICAL CPU ADDRESS OF PROCESSOR                01700064
                                     2430+*                                   USING THIS CHANNEL SET                           01750064
000012                               2431+CSTINIT  DS    H                    PHYSICAL CPU ADDRESS OF PROCESSOR                01800064
                                     2432+*                                   ORIGINALLY CONNECTED TO CHANNEL SET              01850064
                                     2433+*                                   AT IPL OR VARY ONLINE.                           01900064
000014                               2434+CSTFLAGS DS    X                    FLAG BYTE                                        02050064
       00080                         2435+CSTVALID EQU   X'80'                THIS CSTE HAS VALID DATA                         02100064
       00040                         2436+CSTDSC   EQU   X'40'                CHANNEL SET HAS BEEN DISCONNECTED                02150064
       0003F                         2437+CSTRESV  EQU   X'3F'                RESERVED                                         02200064
000015                               2438+        DS    XL3                   RESERVED                                         02250064
000018                               2439+        DS    2F                    RESERVED                                         02300064
       00020                         2440+CSTEND   EQU   *                                                                     02350064

000020 00005                         2442+CSTELP2  EQU   5                    CSTE SIZE IN POWERS OF 2                         02450064

000000 00000                         2444+        ORG   CSTE                                                                   02550064
                                     2445+CSTENTRY DS    16XL(CSTEND-CSTE)    16 ENTRIES PER CST                               02600064
                                     2526 ***************************************************************   06265300
                                     2527 *                                                             *   06270400
                                     2528 * SEQUENTIAL ALGORITHM--RETURN WITH RCHAN UNCHANGED. COMMON   *   06275500
                                     2529 *     CODE FOR SEQ, RSEQ AND LCU - SETS UP CHANNEL ADDRESS AND*  06280600
                                     2530 *     CAT ADDRESS REGISTERS.                                  *   06285700
                                     2531 * NOTE - SEQ REQUIRES NO BASE REGISTER                        *   06290800
                                     2532 *                                                             *   06295900
                                     2533 ***************************************************************   06301000

00004E 4860 A000          00000      2535 SEQ      LH    WORK,CPTPCHAN        GET FIRST CHANNEL PATH ENTRY    @L1A 06311200
000052 1846                          2536          LR    RCAT1,WORK           COPY IT                         @L1A 06316300
000054 8840 0008          00008      2537          SRL   RCAT1,8              ISOLATE CHANNEL NUMBER          @L1A 06321400
000058 8940 0004          00004      2538          SLL   RCAT1,4              CALCULATE CAT INDEX             @L1A 06326500
00005C 5A40 1000          00000      2539          A     RCAT1,CATELP2        GET CAT ADDRESS                 @L1A 06331600
000060 07FE                          2540          BR    RCAT1,CSTCATP        RETURN                          @L1C 06336700

2542 ***************************************************************   06346900
                                     2543 *                                                             *   06352100
                                     2544 * BALANCE ALGORITHM--COMPARE ACTIVE I/O COUNTS AND USE THE CHANNEL* 06357100
                                     2545 *     WITH THE LOWER COUNT. IF EQUAL, THEN USE CHANNEL IN UCB,*   06362200
                                     2546 *     SIMILAR TO LCU ALGORITHM.                               *   06367300
                                     2547 *                                                             *   06372400
                                     2548 ***************************************************************   06377500
```

```
LOC      OBJECT CODE    ADDR1  ADDR2   STMT   SOURCE STATEMENT                                                    XFMLC0202  16.49  11/04/81

2549           USING BALANCE,BASE                                          @D1A  06382600
000062   4860 A000              00062  2550   BALANCE LH    WORK,CPTPCHAN           GET FIRST CHANNEL PATH        @D1A  06387700
000066   1846                          2551           LR    RCAT1,WORK              COPY IT                       @D1A  06392800
000068   48C0 A002                     2552           LH    RCAT2,CPTPCHAN          GET SECOND CHANNEL PATH       @D1A  06397900
00006C   8840 0008                     2553           SRL   RCAT1,8                 ISOLATE FIRST CHANNEL         @D1A  06403000
000070   88C0 0008                     2554           SRL   RCAT2,8                 ISOLATE SECOND CHANNEL        @D1A  06408100
000074   8940 0004                     2555           SLL   RCAT1,CATELP2           CALCULATE FIRST CAT INDEX     @D1A  06413200
000078   89C0 0004                     2556           SLL   RCAT2,CATELP2           CALCULATE SECOND CAT INDEX    @D1A  06418300
00007C   5A40 1000                     2557           A     RCAT1,CSTCATP           GET FIRST CAT ADDRESS         @D1A  06423400
000080   5AC0 1000                     2558           A     RCAT2,CSTCATP           GET SECOND CAT ADDRESS        @D1A  06428500
000084   D501 400A C00A                2559           CLC   CATIOCNT,CATIOCNT-CAT(RCAT2) COMPARE I/O COUNTS       @D1A  06433600
00008A   074E                          2560           BLR                           FIRST LOW, RETURN TO IOS      @D1A  06438700
                                       2561           RET 00008C   4780 F03A                     2562           BE    BAL010                  EQUAL, USE CHANNEL IN UCB     @D1A  06448900

000090   184C                          2564   BAL005  LR    RCAT1,RCAT2             FIRST HIGH, USE SECOND CAT    @D1A  06459100
000092   41A0 A008                     2565           LA    RCHAN,CPTSEC            POINT TO SECOND PATH TABLE    @D1A  06464200
000096   4860 A000                     2566           LH    WORK,CPTPCHAN           GET CHANNEL PATH ENTRY        @D1A  06469300
00009A   07FE                          2567           BR                            RETURN TO IOS                 @D1A  06474400

00009C   BD62 7204       00204         2569   BAL010  CLM   WORK,B'0010',UCBCHA     IS THIS THE LAST CHANNEL USED? @D1A 06484600
0000A0   4770 F02E       00090         2570           BNE   BAL005                  NO, TRY OTHER CHANNEL FIRST   @D1A  06489700
0000A4   07FE                          2571           BR                            YES, RETURN                   @D1A  06494800
                                       2572           END                                                         @D1A  06500000

2  **************************************************************                 00019200
          3  **                                                          **                 00028800
          4  **  MODULE NAME = IECIOSAM                                   **                 00038400
          5  **                                                          **                 00048000
          6  **  DESCRIPTIVE NAME = INPUT/OUTPUT SUPERVISOR               **                 00057600
          7  **                                                          **                 00067200
          8  **  COPYRIGHT =                                              **                 00076800
          9  **    5740-XYN COPYRIGHT IBM CORP 1977, 1981,                **                 00086400
         10  **    LICENSED MATERIAL-PROGRAM,                             **                 00096000
         11  **    PROPERTY OF IBM,                                       **                 00105600
         12  **    REFER TO COPYRIGHT INSTRUCTIONS FORM G120-2083.        **                 00115200
         13  **                                                          **                 00124800
         14  **  STATUS = OS/VS2 JBB1326                                  **                 00134400
         15  **                                                          **                 00144000
         16  **  FUNCTION = 1. MANAGE I/O ACTIVITY BY:                    **                 00153600
         17  **                  A. STARTING NEW I/O REQUESTS             **                 00163200
         18  **                  B. HANDLING INTERRUPTS                   **                 00172800
         19  **                  C. RESTARTING QUEUED I/O REQUESTS        **                 00182400
         20  **             2. PROVIDE A SINGLE DISABLED EXIT (DIE) FOR USE **               00192000
         21  **                  BY THE CALLERS OF IOS                    **                 00201600
         22  **             3. SUPPORT THE ERP'S (ERROR RECOVERY PROCEDURES) **              00211200
         23  **                  THAT ARE PROVIDED                        **                 00220800
         24  **                                                          **                 00230400
         25  **  NOTES = THIS MODULE HAS BEEN MODIFIED TO SUPPORT CHANNEL  ** @G65APLK       00240000
         26  **          SET SWITCHING (CHS). THIS SUPPORT GENERALLY       ** @G65APLK       00249600
         27  **          CONSISTS OF REPLACING ALL TESTS FOR THE CPU ADDRESS ** @G65APLK     00259200
         28  **          WITH A TEST FOR THE CHANNEL SET ID (CSID)--HOWEVER, ** @G65APLK     00268800
```

```
LOC    OBJECT CODE      ADDR1 ADDR2   STMT   SOURCE STATEMENT                                              XFMLC0202 16.37  11/04/81

29   *          ALL THE COMMENTS HAVE NOT BEEN CHANGED WHEN THE       @G65APLK  00278400
                                       30   *          INSTRUCTION ITSELF DID NOT REQUIRE A CHANGE. THE     @G65APLK  00288000
                                       31   *          RESULT IS THAT CARE SHOULD BE USED WHEN 'CPU' IS     @G65APLK  00297600
                                       32   *          ENCOUNTERED IN A COMMENT--IT MAY MEAN CSID           @G65APLK  00307200
                                       33   *                                                                         00316800
                                       34   *    DEPENDENCIES = NONE                                                  00326400
                                       35   *                                                                         00336000
                                       36   *    RESTRICTIONS = NONE                                                  00345600
                                       37   *                                                                         00355200
                                       38   *    REGISTER CONVENTIONS = SEE EQUATES                                   00364800
                                       39   *                                                                         00374400
                                       40   *    PATCH LABEL = IOSPATCH                                               00384000
                                       41   *                                                                         00393600
                                       42   *    MODULE TYPE = I/O CONTROL                                            00403200
                                       43   *                                                                         00412800
                                       44   *    PROCESSOR = ASSEMBLER                                                00422400
                                       45   *                                                                         00432000
                                       46   *    MODULE SIZE = SEE SD LENGTH                                @G81BPLR  00441600
                                       47   *                                                                         00451200
                                       48   *    ATTRIBUTES = DISABLED, KEY 0, SUPERVISOR STATE, RESIDENT             00460800
                                       49   *                                                                         00470400
                                       50   *    ENTRY POINTS = IECVSTIO - FROM THE STARTIO MACRO                     00480000
                                       51   *                   IECHNSCH - FROM THE SRB DISPATCHER                    00489600
                                       52   *                   IECINT   - FROM THE I/O FLIH                          00499200
                                       53   *                   IECINT2  - FROM THE I/O FLIH               @G50DPLK   00508800
                                       54   *                   IECIPC   - FROM INTER PROCESSOR COMM.                 00518400
                                       55   *                   IECFRR   - FROM RTM                                   00528000
                                       56   *                                                                         00537600

10450  ***                                                                          *** 22195200
                              10451   *                                                                              22204800
                              10452  ***                        INDICATE ALL BUT BASE ADDRESSABILITY              *** 22214400
                     00000    10453           USING  IOSB,IOSBR                INDICATE IOSB ADDRESSABILITY           22224000
                     00000    10454           USING  LCCA,LCCAR                INDICATE LCCA ADDRESSABILITY           22233600
                     00000    10455           USING  UCB,UCBR                  INDICATE UCB ADDRESSABILITY            22243200
                     00000    10456           USING  IOQ,IOQR                  INDICATE IOQE ADDRESSABILITY           22252800

000BD4 04C0                   10458  EPOSTIO0 SPM   WRKC                       SET CONDITION CODE FROM SIO @G65JPLN   22272000

000BD6 4770 5C58              10460           BC    4+2+1,IPOST020             BRANCH CSW STORED, BUSY OR  @G65JPLN   22291200
                              10461   *       SPACE 1                                                                 22300800
                       00C58  10462  ***                                                                          *** 22310400
                              10463  ***                        CONDITION CODE EQUALS ZERO ON THE SIO             *** 22320000
                              10464  ***                                                                          *** 22329600
000BDA 18C6                   10465           LR    WRKC,WRK6                              COPY DEVICE ADDRESS @G65JPLN 22339200
000BDC 88C0 0008     00008    10466           SRL   WRKC,EIGHT                 ISOLATE CHANNEL NUMBER      @G65JPLN   22348800
000BE0 89C0 0003     00003    10467           SLL   WRKC,CHTELP2               MULT. BY LENGTH CHANNEL TBL @G65JPLN   22358400
000BE4 5EC0 500C     0000C    10468           AL    WRKC,IOCCTBL               POINT AT CHANNEL TABLE      @G65JPLN   22368000
                     00000    10469           USING CHT,WRKC                   INDICATE CHT ADDRESSABILITY @G65JPLN   22377600

10471  ***                                                                          *** 22396800
                              10472   *       IF SELECTOR CHANNEL, MARK BUSY IN CHANNEL                               22406400
                              10473   *       AVAILABLE TABLE (CAT)                                                   22416000
                              10474  ***                                                                          *** 22425600
```

| LOC | OBJECT CODE | ADDR1 | ADDR2 | STMT | SOURCE STATEMENT | | | |
|---|---|---|---|---|---|---|---|---|
| 000BE8 | 9503 C001 | 00001 | | 10475 | CLI | CHTTYPE,CHTSEL | SELECTOR CHANNEL? +------+ | |
| | | | | 10476 | DROP | WRKC | | |
| 000BEC | 58C0 3304 | 00304 | | 10477 | L | WRKC,IRTCAT | POINT AT CAT TABLE ENTRY | @G65JPLN |
| | | | 00000 | 10478 | USING | CAT,WRKC | | @G65JPLN |
| 000BF0 | 4770 5BF8 | 00BF8 | | 10479 | BNE | IPOST010 | NO - DON'T MARK BUSY <------+ | @G65JPLN |
| 000BF4 | 9680 C001 | 00001 | | 10481 | OI | CATFLA,CATBSY | MARK BUSY IN CAT | |
| | | | | 10483 | *** | | | *** |
| | | | | 10484 | * | | SET FLAGS | @ZA06063 |
| | | | | 10485 | *** | | | *** |
| 000BF8 | 96A2 7206 | 00206 | | 10486 | IPOST010 OI | UCBFLA,UCBBSY+UCBPST+UCBACTV | | |
| | | | | 10487 | * | | SHOW ACTIVE IOQE ON UCB | |
| 000BFC | 9608 C001 | 00001 | | 10488 | OI | CATFLA,CATSOL | INDICATE SIO CC=0 | @ZA30350 |
| 000C00 | 4840 400A | 0000A | | 10489 | LH | LNKR,CATIOCNT | GET ACTIVE I/O COUNT | @L1A |
| 000C04 | 4140 4001 | 00001 | | 10490 | LA | LNKR,ONE(,LNKR) | INCREMENT BY 1 | @L1A |
| 000C08 | 4040 C00A | 0000A | | 10491 | STH | LNKR,CATIOCNT | STORE UPDATED COUNT | @L1A |
| | | | | 10492 | DROP | WRKC | DROP CAT ADDRESSABILITY | |
| | | | | 10494 | *** | | | *** |
| | | | | 10495 | * | | DEQUEUE REQUEST AND EXIT FROM POST SIO | * |
| | | | | 10496 | *** | | | *** |
| 000C0C | 4540 9848 | 02848 | | 10497 | BAL | LNKR,EFRUCBL1 | FREE UCBLOCK | |
| 000C10 | 58B0 32F0 | 002F0 | | 10498 | L | IOQR,IRTIOQ | RESTORE THE ACTIVE IOQE | |
| 000C14 | 4540 8222 | 01222 | | 10499 | BAL | LNKR,IRTDDSV | DEQUEUE REQUEST IF NECESSARY | |
| 000C18 | 5840 3314 | 00314 | | 10500 | L | LNKR,IRTDDSV | RESTORE RETURN REGISTER | |
| 000C1C | 07F4 | | | 10501 | BR | LNKR | RETURN TO CALLER | |
| | | 01A52 | | 12882 | ISTAT028 EQU | * | | @G874PLQ |
| | | | | 12883 | *** | | | *** |
| | | | | 12884 | * | | HANDLE UCB STATUS BASED ON CSW STATUS | * |
| | | | | 12885 | *** | | | *** |
| 001A52 | 9108 0044 | 00044 | | 12886 | TM | CSWUNST,CSWCE | TEST FOR CHANNEL END STATUS | @G874PLQ |
| 001A56 | 4780 8B86 | 01B86 | | 12887 | BZ | ISTAT130 | *BRANCH IF IT IS NOT PRESENT | @ZA37786 |
| 001A5A | 12AA | | | 12889 | LTR | WRKA,WRKA | DOES CAT EXIST? | @L1A |
| 001A5C | 4780 8A6A | 01A6A | | 12890 | BZ | ISTAT029 | NO, BRANCH | @L1A |
| 001A60 | 4840 A00A | 0000A | | 12892 | LH | LNKR,CATIOCNT-CAT(,WRKA) | GET ACTIVE I/O COUNT | @L1A |
| 001A64 | 0640 | | | 12893 | BCTR | LNKR,0 | DECREMENT BY 1 | @L1A |
| 001A66 | 4040 A00A | 0000A | | 12894 | STH | LNKR,CATIOCNT-CAT(,WRKA) | STORE UPDATED COUNT | @L1A |
| 001A6A | 9104 0044 | 00044 | | 12895 | TM | CSWUNST,CSWDE | TEST FOR DEVICE END STATUS | @L1A |
| 001A6E | 4780 8A76 | 01A76 | | 12896 | BZ | ISTAT040 | *BRANCH IF IT IS NOT PRESENT | @L1C |
| 001A72 | 947F 7206 | 00206 | | 12898 | ISTAT029 NI | UCBFLA,FF-UCBBSY | CLEAR UCB BUSY INDICATOR | @L2A |
| 001A76 | 94FD 7206 | 00206 | | 12899 | ISTAT040 NI | UCBFLA,FF-UCBACTV | CLEAR ACTIVE CHANNEL PROGRAM | @L2A |
| 001A7A | 94FD 7214 | 00214 | | 12900 | NI | UCBFLC,FF-UCBTICBT | INDICATE INTERRUPT RECIEVED | @L2A |
| 001A7E | 5810 7214 | 00214 | | 12901 | L | WRK1,UCBEXTPT | GET ADDRESS OF UCB EXTENSION | @L2A |
| | | | 00000 | 12902 | USING | UCBCMEXT,WRK1 | ESTABLISH ADDRESSABILITY | @L2A |
| 001A82 | 94BF 1007 | 00007 | | 12903 | NI | UCBFL7,FF-UCBSSPND | TURN OFF SUSPEND BIT | @L2A |
| | | | | 12904 | DROP | WRK1 | | |
| | | | | 12906 | *** | | CHECK FOR ABNORMAL STATUS | *** |
| | | | | 12907 | * | | | * |

```
LOC      OBJECT CODE      ADDR1 ADDR2  STMT   SOURCE STATEMENT                                                                           XFMLC0202  16.37  11/04/81

12908  ***                                                                                    ***          40608000
001A86   9110 7206              00206  12909         TM    UCBFLA,UCBPSNS       TEST TO SEE IF SENSE PENDING                                      40617600
001A8A   4710 8BEA              01BEA  12910         BO    ISTAT140             *BRANCH IF IT IS                                                  40627200

12912         TM    IOQFLA,IOQMERGE      MUST CSW BE ORED TOGETHER?                                        40646400
001A8E   9102 B004              00004  12913   *                                NOTE: THIS BIT IS SET BY THE TRAP                                 40656000
                                       12914   *                                EXIT AND RESET ANYTIME THE IOQ IS                                 40665600
                                       12915   *                                DEQUEUED, HENCE THE MVC IS DONE                                   40675200
                                       12916   *                                ONLY FOR THE FIRST NON-PCI                                        40684800
                                       12917   *                                INTERRUPT.                                                        40694400
001A92   47E0 8AA0              01AA0  12918         BNO   ISTAT045             NO--DO MOVE                                          @G87VPLK     40704000
001A96   D601 2018 0044         00018  12919         OC    IOSTATUS,FLCCSW+FOUR OR SECONDARY STATUS                                  @G87VPLK     40713600
001A9C   47F0 8AA6              01AA6  12920         B     ISTAT046             SKIP MOVE                                            @G87VPLK     40723200
001AA0   D206 2015 0041  ISTAT045      00015  12921   MVC  IOSCSW,FLCCSW+ONE    MOVE 7 BYTES OF CSW TO IOSB                          @G87VPLK     40732800
                                ISTAT046  01AA6  12922         EQU   *                                                               @G87VPLK     40742400

001AA6   9182 0044              00044  12924         TM    CSWUNST,CSWATUCK     TEST FOR ATTEN. OR UNIT CHECK                                     40761600
001AAA   4770 8C0E              01C0E  12925         BNZ   ISTAT180             *BRANCH IF EITHER IS PRESENT                                      40771200

12927  ***                                                                                    ***          40790400
                                       12928   *                                RESET CONDITION CODE 3 MESSAGE FLAG                               40800000
                                       12929  ***                                                                                    ***          40809600
                                ISTAT050  12930         DS   0H                                                                                   40819200
001AAE   58E0 7214              00214  12931         L     WRKEVEN,UCBEXTPT     LOAD EXTENSION POINTER                               @G65JPLN     40828800
                                       12932         USING UCBCMEXT,WRKEVEN                                                                       40838400
001AB2   D600 E00A B007  0000A 00007  12933         OC    UCBPMSK(ONE),IOQPTH  RESET MESSAGE ISSUED BIT                             @ZA06063     40848000
001AB8   D700 E00A B007  0000A 00007  12934         XC    UCBPMSK(ONE),IOQPTH  *IF ON                                               @ZA06063     40857600
                                       12935  ***                                                                                    ***          40867200
                                       12936   *                                INTERFACE WITH DEVICE DEPENDENT TRAP CODE            * @G65JPLN   40876800
```

Having thus described my invention, what I claim as new and desire to secure by Letters Patent is:

1. A method in a data processing system for quickly finding a data path for a requested I/O device, the data path including a channel path and a control unit, the data path being provided between the requested I/O device and a main storage under the control of an I/O request from a central processing unit (CPU) to a channel processor, the method comprising:

generating an outstanding request (CAT) count for each channel path useable by the system, obtaining a set of channel path identifiers (CH IDs) for all channel paths capable of connecting to the requested I/O device, finding a candidate channel path identifier (CH ID) for an available CH ID having the lowest CAT count in the set provided by the obtaining step, attempting to connect the requested I/O device with the candidate channel path CH ID found by the finding step to obtain a data path, repeating the finding step if the attempting step is unsuccessful in connecting the candidate channel path to a data path by finding another candidate channel path.

2. A method as defined in claim 1, the finding step further comprising:

indicating a subset of currently available CH IDs from the set of CH IDs defined by the obtaining step, selecting the CAT counts for the subset of CH IDs provided by the indicating step, sorting the subset of CH ID provided by the indicating step in CAT count order to find the lowest CAT count available CH ID as the candidate channel path.

3. A method as defined in claim 1, the finding step further comprising:

selecting the CAT counts for the CH IDs obtained by the obtaining step, sorting the obtained CH IDs in CAT count order into a sequence of CH IDs for the set, and testing a channel path for connection availability to the requested I/O device beginning with the CH ID having the lowest CAT count in the set, for finding a candidate channel path as the lowest CAT count available CH ID tested to be connectable.

4. A method as defined in claim 1, further comprising:

again repeating the finding step in the process of finding a data path when the control unit in an attempted data path is busy with another request if the attempting step finds that the requested I/O device cannot be connected to the candidate channel path.

5. A method as defined in claim 1, further comprising:

again repeating the finding step in the process of finding a data path when the I/O device is busy if the attempting step finds that the requested I/O device is busy and cannot be connected to the candidate channel path.

6. A method as defined in claim 3, the testing step further comprising:

determining if any CH ID in the set has not been tested by the testing step, providing an address to a next CH ID having the next higher CAT count in the sequence of CH IDs provided by the sorting step, repeating the testing step with the CH ID located at the address of the providing step, whereby the first available CH ID found by the repeating step is the candidate channel path CH ID.

7. A method as defined in claim 1, further comprising:

the finding step finding a plurality of available CH ID's with the same lowest available CAT count, tie-breaking the plurality of available CH ID's found by the finding step by selecting any one CH ID from the plurality as the candidate channel path, whereby the tie-breaking step can use any technique to select one of the plurality of CH ID's.

8. A method as defined in claim 3, in which the method further comprises:

the obtaining step obtaining the CH IDs in the set in reverse CH ID order in a forward sequence field and a backward sequence field, in which a maximum of two CH ID's exist in the set, the sorting step selecting and comparing the CAT counts for both CH IDs to find the CH ID with the lowest CAT count, the testing step testing the availability of the CH ID found by the sorting step having the lowest CAT count and if availability exists this CH ID being the candidate channel path, repeating the testing step on the other CH ID if the CH ID with the lowest CAT count is found not available by the testing step and then selecting the other CH ID as the candidate channel path if the other CH ID is available, and executing a queuing step if neither CH ID is available to put the I/O request on a logical channel queue for the set.

9. A method as defined in claim 1, further comprising:

signalling if a successful connection to a data path is made for the candidate channel path by the attempting step, whereby the candidate channel path becomes a connected channel path and the requested I/O device becomes a connected device, incrementing the CAT count for the connected channel path when the signalling step signals the I/O device has been successfully connected to a data path and has become a connected device, whereby no CAT count is incremented when the signalling step indicates an unsuccessful connection of the requested I/O device to the candidate channel path.

10. A method as defined in claim 9, further comprising:

also signalling completion status signals for the connected device to the channel processor when the connected device completes an operation, analyzing the completion status signals in the channel processor for a successful or unsuccessful connection to a data path by the requested I/O device that caused the sending of the status signals by the signalling step in order to identify a related prior channel path subjected to a connection attempt by the attempting step, decrementing the CAT count for the related prior channel path after the analyzing step identifying the related prior channel path, whereby no CAT count is decremented if the signalling step sends completion status signals to the channel processor for which the analyzing step analyzes the status signals and determines an unsuccessful connection was attempted by the attempting step to the related prior channel path.

11. A method as defined in claim 10, further comprising:
  queuing the I/O request on a logical channel queue for the set of channel paths obtained by the obtaining step if the repeating step finds no data path that includes any channel path that is currently available in the set,
  whereby the queued I/O request can later be activated for initiating another attempt to find a data path for connecting the requested I/O device.

12. A method as defined in claim 11, further comprising:
  activating the finding step for each request existing in the logical channel queue when the also signalling step sends completion status signals for a prior connection attempt.

13. A method as defined in claims 4 or 5, in which the method is contained in a program executable by the CPU, the attempting step further comprising:
  generating a start I/O (SIO) or start I/O fast (SIOF) instruction by the CPU and inserting into the SIO or SIOF instruction identifiers for the requested I/O device and a control unit identifier and the CH ID of the candidate channel path found by the testing step,
  and the attempting step being provided by the CPU executing the SIO or SIOF instruction in an attempt to connect the requested I/O device to the control unit and the candidate channel path,
  whereby the executed SIO or SIOF instruction defines a data path.

14. A method as defined in claim 13, further comprising:
  transmitting an I/O interrupt signal from the channel processor to the CPU to signal either (1) the completion of a successful connection or (2) unavailability of the requested I/O device or the control unit which was not available to a previously executed related SIO or SIOF instruction which obtained an unsuccessful connection and caused the I/O interrupt signal.

15. A method as defined in claim 14, in which the repeating step further comprises:
  queuing the I/O request on a logical channel queue for the set of channel paths obtained by the obtaining step if the repeating step finds no data path that includes any channel path that is currently available in the set,
  initiating an IOS routine in response to the I/O interrupt signal in the transmitting step,
  whereby any other request to the same CH ID in every logical channel queue will again initiate the finding step in response to the initiating step.

16. A method as defined in claim 12, in which the method is contained in the channel processor, further comprising:
  issuing by the CPU a start subchannel instruction identifying the requested I/O device but not identifying any channel path,
  entering the generating step in the channel processor which executes succeeding steps,
  whereby the method is executed by the channel processor.

17. A method as defined in claim 16, in which the analyzing step is executed in the channel processor, the method further comprising:
  transmitting an I/O interrupt signal from the channel processor to the CPU after the channel processor determines a successful completion of operations for a successful connection in response to the signalling step sending the channel processor a completion status signal which the analyzing step analyzes as a successful connection signal.

18. A method as defined in claim 17, further comprising:
  initiating the channel processor to execute the queuing step if the repeating step finds no data path that includes any channel path in the set obtained by the obtaining step,
  whereby the channel processor then goes into an idle state.

19. A method as defined in claim 18, further comprising:
  starting the channel processor from the idle state in response to a completion status signal sent by the signalling step,
  whereby any other request to the same CH ID in every logical channel queue again initiates the finding step.

20. A method as defined in claim 19, further comprising:
  executing the method in microcode in the channel processor.

* * * * *